United States Patent
Takeda et al.

(10) Patent No.: US 12,376,117 B2
(45) Date of Patent: Jul. 29, 2025

(54) PDCCH MONITORING FOR SINGLE-DCI TO MULTI-CELL SCHEDULING

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Mostafa Khoshnevisan, San Diego, CA (US); Yiqing Cao, Beijing (CN); Alberto Rico Alvarino, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/759,519

(22) PCT Filed: Jan. 31, 2020

(86) PCT No.: PCT/CN2020/074092
§ 371 (c)(1),
(2) Date: Jul. 27, 2022

(87) PCT Pub. No.: WO2021/151237
PCT Pub. Date: Aug. 5, 2021

(65) Prior Publication Data
US 2023/0085896 A1    Mar. 23, 2023

(51) Int. Cl.
*H04W 72/23* (2023.01)
*H04W 24/08* (2009.01)
*H04W 72/1263* (2023.01)

(52) U.S. Cl.
CPC .......... *H04W 72/23* (2023.01); *H04W 24/08* (2013.01); *H04W 72/1263* (2013.01)

(58) Field of Classification Search
CPC . H04W 72/23; H04W 24/08; H04W 72/1263; H04L 5/0044; H04L 5/0092; H04L 5/005
See application file for complete search history.

(56) References Cited

U.S. PATENT DOCUMENTS

| 2011/0076962 A1* | 3/2011 | Chen | H04L 5/001 455/68 |
| 2011/0205978 A1* | 8/2011 | Nory | H04L 5/0007 370/329 |

(Continued)

FOREIGN PATENT DOCUMENTS

| CN | 105992378 A | 10/2016 |
| CN | 110366251 A | 10/2019 |

OTHER PUBLICATIONS

Supplementary European Search Report—EP20916904—Search Authority—The Hague—Sep. 29, 2023.

(Continued)

*Primary Examiner* — Edan Orgad
*Assistant Examiner* — Malick A Sohrab
(74) *Attorney, Agent, or Firm* — Haynes and Boone, LLP

(57) ABSTRACT

Wireless communications systems and methods related to joint-carrier scheduling using a single downlink control information (DCI) signal. The user equipment (UE) receives from a base station (BS) of a first serving cell, a downlink control information (DCI) that indicates a joint-carrier scheduling scheme. Using the joint-carrier scheduling scheme in the DCI, the UE schedules first data for communication on a first shared channel associated with the first serving cell and second data for communication on a second shared channel associated with a second serving cell.

35 Claims, 10 Drawing Sheets

(56) References Cited

U.S. PATENT DOCUMENTS

| | | | |
|---|---|---|---|
| 2013/0039296 A1* | 2/2013 | Damnjanovic | H04W 72/23 370/329 |
| 2014/0036789 A1* | 2/2014 | Miao | H04L 5/005 370/329 |
| 2014/0036849 A1* | 2/2014 | Ribeiro | H04W 72/23 370/329 |
| 2014/0254410 A1 | 9/2014 | Seo et al. | |
| 2017/0135127 A1 | 5/2017 | Nogami et al. | |
| 2019/0288819 A1 | 9/2019 | Dinan | |
| 2020/0304230 A1* | 9/2020 | Papasakellariou | H04L 5/0094 |
| 2022/0007363 A1* | 1/2022 | Wang | H04W 72/0453 |
| 2022/0046665 A1* | 2/2022 | Takeda | H04W 72/1268 |
| 2022/0053540 A1* | 2/2022 | Takeda | H04L 5/001 |
| 2022/0116969 A1* | 4/2022 | He | H04L 5/0064 |
| 2022/0124788 A1* | 4/2022 | Kittichokechai | H04L 1/0008 |
| 2022/0167267 A1* | 5/2022 | Ma | H04W 52/0235 |

OTHER PUBLICATIONS

Catt: "Discussion on Joint DCI to Support up to 32 CCs", 3GPP TSG RAN WG1 Meeting #81, R1-152567, Fukuoka, Japan, May 25-29, 2015, May 29, 2015 (May 29, 2015) Section 2, 1 Pages.

International Search Report and Written Opinion—PCT/CN2020/074092—ISA/EPO—Oct. 27, 2020.

Nokia Networks: "On Joint Grants for CA Enhancements up to 32 CCs", 3GPP TSG-RAN WG1 Meeting #82, R1-154468 , Beijing, China, Aug. 24-28, 2015, Aug. 28, 2015 (Aug. 28, 2015) Section 2, 5 Pages.

\* cited by examiner

PDCCH MONITORING FOR SINGLE-DCI TO MULTI-CELL SCHEDULING

CROSS-REFERENCE TO RELATED APPLICATIONS

The present application is a 35 U.S.C. 371 National Phase entry of Patent Cooperation Treaty (PCT) Application No. PCT/CN2020/074092, filed Jan. 31, 2020. The aforementioned application is hereby expressly incorporated herein by reference in its entirety.

TECHNICAL FIELD

This application relates to wireless communication systems, and more particularly to scheduling data on multiple cells using a single downlink control information signal.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Dynamic spectrum sharing (DSS) allows the LTE technology and NR technology to operate in the same frequency band and share the same frequency spectrum. DSS also allows the operators to dynamically allocate the frequency spectrum based on need. This means that a frequency band of an NR cell that operates using DSS may be allocated to an LTE cell and vice versa. One benefit of the aspects below is that the aspects allow a non-DSS cell to schedule a physical downlink shared channel (PDSCH) or a physical uplink shared channel (PUSCH) on the NR cell with a single DCI. The aspects below also allow a DSS or non-DSS cell to schedule a PDSCH or PUSCH on multiple cells using a single DCI.

More generally, the aspects below are also directed to a joint-carrier scheduling technique that describes how a primary-secondary (P(S) Cell) or a secondary cell (S Cell) uses a single downlink control information (DCI) to schedule data on a PDSCH or PUSCH used by a P(S) Cell and on a PDSCH or PUSCH used by the S Cell. The aspects below are directed to a cross-carrier scheduling technique that describes how an S Cell uses a single DCI signal of the S Cell to schedule data on a PDSCH or PUSCH used by the P(S) Cell.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS) of a first serving cell, a downlink control information (DCI) that indicates a joint-carrier scheduling scheme, and scheduling, using the joint-carrier scheduling scheme in the DCI, first data for communication over a first shared channel associated with the first serving cell and second data for communication over a second shared channel associated with a second serving cell.

In a further aspect of the disclosure the first data communication is a downlink transmission or an uplink reception.

In a further aspect of the disclosure the second data communication is a downlink transmission or an uplink reception.

In a further aspect of the disclosure, the method further comprises transmitting the first data using the first shared channel and the second data using the second shared channel.

In a further aspect of the disclosure, a carrier indicator field (CIF) in the DCI indicates the joint-carrier scheduling scheme.

In a further aspect of the disclosure, the method further comprises receiving, at the UE, a radio resource control (RRC) signal indicating a correspondence between a CIF value and the joint-carrier scheduling scheme.

In a further aspect of the disclosure, the method further comprises receiving, at the UE, a RRC signal indicating a number of physical downlink control channel (PDCCH) candidates in a search space that include the DCI indicating the joint-carrier scheduling scheme.

In a further aspect of the disclosure, the method further comprises determining a number of PDCCH candidates associated with the DCI indicating the joint-carrier scheduling scheme based on a number of PDCCH candidates associated with a second DCI indicating a same-carrier scheduling scheme or a cross-carrier scheduling scheme.

In a further aspect of the disclosure, the method further comprises receiving the DCI indicating the joint-carrier scheduling scheme when the UE enables search space sharing for a DCI indicating a cross-carrier scheduling scheme.

In a further aspect of the disclosure, the method further comprises monitoring, at the UE, at least one PDCCH candidate in a search space set that carries the DCI for up to a configurable number of DCI format sizes when a CIF field indicates the joint-carrier scheduling scheme, and counting, at the UE, a number of the DCI formats sizes based on the at least one monitored PDCCH candidate in the search space set.

In a further aspect of the disclosure, the method further comprises determining a number of DCI format sizes for the joint-carrier scheduling scheme based on a number of DCI format sizes used for scheduling data on the first serving cell or a number of DCI format sizes used for scheduling data on the second serving cell.

In a further aspect of the disclosure, the method further comprises determining a DCI format size of the DCI as one of preconfigured DCI format sizes transmitted by the BS.

In a further aspect of the disclosure, the method further comprises determining a number of PDCCH candidates based on a number of downlink cells and a number of sets of downlink cells scheduled using the DCI, and monitoring, at the UE, up to the number of PDCCH candidates on an active downlink bandwidth parts (DL BWP) of the first serving cell.

In a further aspect of the disclosure, the method further comprises determining a number of control channel elements (CCEs) based on a number of downlink cells and a number of sets of downlink cells scheduled using the DCI, and monitoring, at the UE, up to the number of CCEs on an active downlink bandwidth parts (DL BWP) of the first serving cell.

In a further aspect of the disclosure, the method further comprises storing, at the UE, a configurable number of DCIs associated with the first serving cell and the second serving cell included in the joint-carrier scheduling scheme.

In a further aspect of the disclosure, the configurable number of DCIs is associated with a physical downlink shared channel (PDSCH) transmission or a physical uplink shared channel (PUSCH) transmission.

In another aspect of the disclosure, a method of wireless communication, comprises configuring, at a base station (BS) of a first serving cell, a joint-carrier scheduling scheme using a downlink control information (DCI), wherein in the joint-carrier scheduling scheme causes a first data to be communicated on a first shared channel associated with the first serving cell and second data to be communicated on a second shared channel associated with a second serving cell, and transmitting, by the BS to a user equipment (UE), the DCI that indicates the joint-carrier scheduling scheme.

In a further aspect of the disclosure, the method further comprises configuring, at the BS, a radio resource control (RRC) signal indicating a correspondence between a CIF value and the joint-carrier scheduling scheme.

In a further aspect of the disclosure, the method further comprises configuring, at the BS, a radio resource control (RRC) signal indicating a number of physical downlink control channel (PDCCH) candidates in a search space set that can include the DCI indicating the joint-carrier scheduling scheme.

In a further aspect of the disclosure, the method further comprises configuring a number of PDCCH candidates associated with the DCI indicating the joint-carrier scheduling scheme based on a number of PDCCH candidates associated with a second DCI indicating a same-carrier scheduling scheme or a cross-carrier scheduling scheme.

In a further aspect of the disclosure, the method further comprises transmitting an RRC signal to the UE that enables search space sharing for a cross-carrier scheduling scheme or a same-carrier scheduling scheme, and configuring the DCI indicating the joint-carrier scheduling scheme when the RCC signal enables the search space sharing.

In a further aspect of the disclosure, the method further comprises configuring a number of DCI format sizes for the joint-carrier scheduling scheme and transmitting a PDCCH that includes the DCI in at least one of the DCI format sizes.

In a further aspect of the disclosure, the method further comprises configuring a number of DCI format sizes for the joint-carrier scheduling scheme based on a number of DCI format sizes used for scheduling data on the first serving cell or a number of DCI format sizes used for scheduling data on the second serving cell.

In a further aspect of the disclosure, the method further comprises determining a DCI format size of the DCI as one of preconfigured DCI format sizes.

In a further aspect of the disclosure, the method further comprises determining a number of PDCCH candidates based on a number of downlink cells and a number of sets of downlink cells scheduled using the DCI, and transmitting, to the UE, up to the number of PDCCH candidates on an active downlink bandwidth parts (DL BWP) of the first serving cell.

In a further aspect of the disclosure, the method further comprises determining a number of control channel elements (CCEs) based on a number of downlink cells and a number of sets of downlink cells scheduled using the DCI, and transmitting, at the BS, up to the number of CCEs on an active downlink bandwidth parts (DL BWP) of the first serving cell.

In a further aspect of the disclosure, the method further comprises transmitting, at the BS, a configurable number of DCIs associated with the first serving cell and the second serving cell included in the joint-carrier scheduling scheme.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
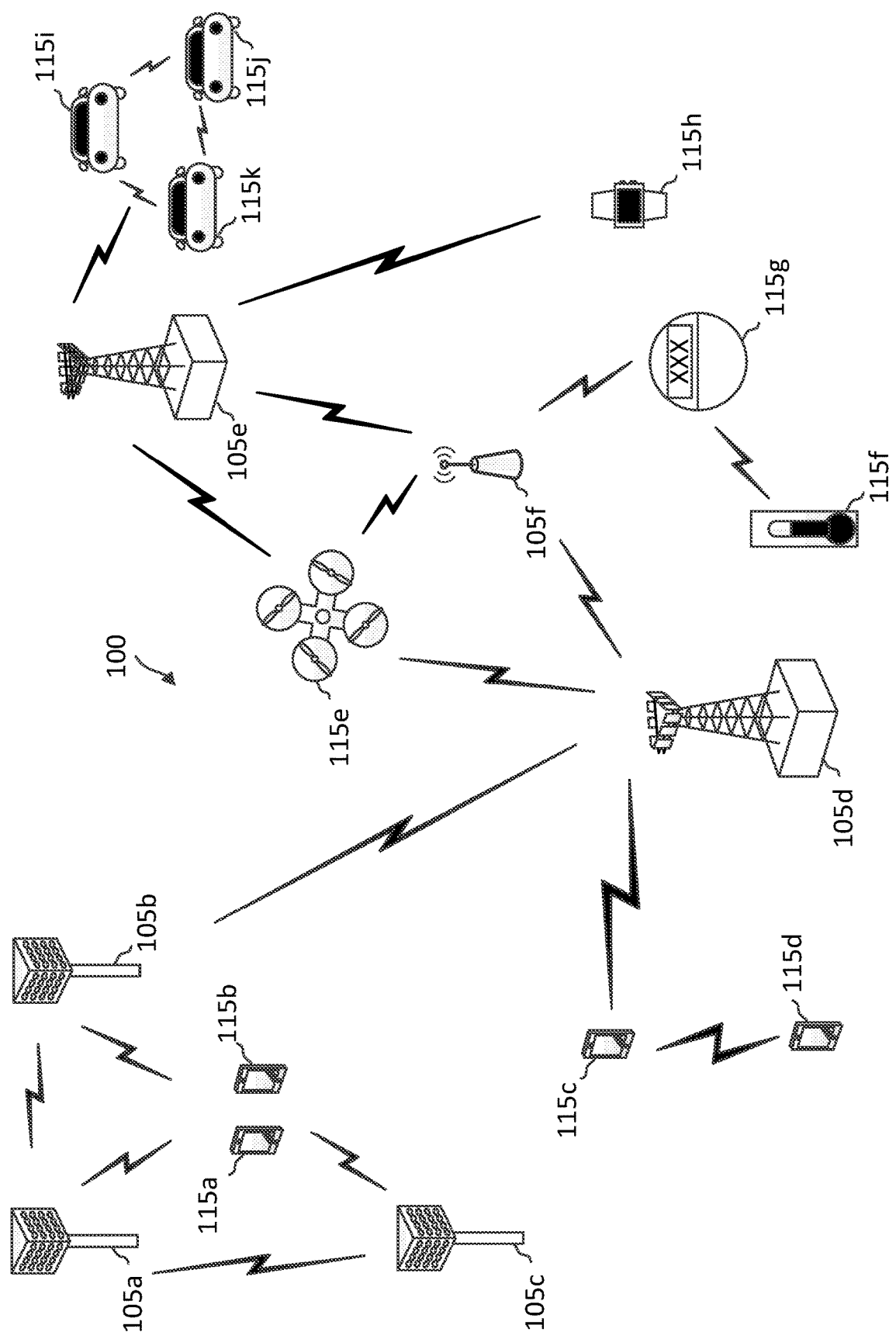
FIG. 1 illustrates a wireless communication network according to some aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The aspects in the application describe mechanisms for scheduling data using a cross-carrier scheduling scheme and a joint (or multi)-carrier scheduling scheme. In a cross-carrier scheduling scheme, a scheduling cell uses a DCI of the scheduling Cell to schedule data on a PDSCH or PUSCH used by a scheduled cell. A scheduling cell and a scheduled cell can be either the primary cell (P Cell), the primary secondary (P(S) Cell), or a secondary cell (S Cell). In a multi-carrier scheduling scheme, a scheduling cell use a single DCI to schedule data for PDSCH or PUSCH transmissions on multiple scheduled cells, where the scheduling cell may be P Cell, P(S) Cell, or S Cell, and each of the scheduled cells may be P Cell, P(S) Cell, or S Cell.

Aspects of the present disclosure can provide several benefits. In particular, the aspects provide benefits in the DSS environment, where a non-DSS cell can use a DCI to schedule data on the DSS cell when the DSS cell does not use the carriers associated with the DSS cell because the carriers have been allocated to another DSS cell. Nevertheless, the embodiments are not limited to DSS and can schedule PDSCH or PUSCH on multiple cells using a single DCI.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V) communications among the UEs 115*i*-115*k*, vehicle-to-everything (V2X) communications between a UE 115*i*, 115*j*, or 115*k* and other UEs 115, and/or vehicle-to-infrastructure (V2I) communications between a UE 115*i*, 115*j*, or 115*k* and a BS 105. Network 100 that offers TDD communications may be referred to as TDD network.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 20. Each slot may be further divided into mini-slots. In a FDD mode, simultaneous UL transmission and DL reception may occur in a paired spectrum. For example, each slot includes a UL subframe in a UL frequency band and a DL subframe in a DL frequency band. A subframe may also be referred to as a slot. In a TDD mode, the UL transmission and DL reception occur at different time periods using the same frequency (also called unpaired spectrum). For example, a subset of the slots (e.g., DL slots) in a radio frame may be used for DL transmissions and another subset of the slots (e.g., UL slots) in the radio frame may be used for UL transmissions. In a TDD mode, there is one or more slots containing periods that can be used to switch from the resources used for DL reception to the resources used for UL transmission. The resource that can be used for switching from DL reception to UL transmission can be referred as special or flexible resource.

The DL slots and the UL slots can be further divided into several regions. For example, each DL or UL slots may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained slots. A self-contained subframe may include a portion for DL communication and a portion for UL communication. A self-contained slot can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system bandwidth (BW) or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared spectrum or unlicensed spectrum. For example, the network 100 may be an NR-unlicensed (NR-U) network operating over an unlicensed spectrum In some aspects, a cell may be a primary serving cell P(S) Cell) or a serving cell (also referred to as a secondary cell) and collectively known as an S Cell. A P(S) Cell may operate on a primary frequency, in which UE 115 either performs the initial connection establishment procedure, initiates the connection re-establishment procedure with BS 105, HARQ-ACK feedback using a physical uplink control channel (PUCCH), radio link monitoring, or a combination thereof. P(S) Cell may also be indicated as a primary cell in a handover procedure. An S Cell may operate on a secondary frequency and may provide additional radio resources for transmissions between UE 115 and BS 105.

In conventional networks, a cell, such as a P(S) Cell or an S Cell may use a DCI to schedule data on a PDSCH or PUSCH the carrier used by the respective cells. This is referred to as a same-carrier scheduling scheme. In the same-carrier scheduling scheme, the P(S) Cell may use a PDCCH carrying a DCI to schedule a PDSCH or PUSCH that carries data on a carrier associated with the P(S) Cell. Similarly, the S Cell may use a PDCCH to carry a DCI to schedule a PDSCH or PUSCH on a carrier that is associated with the S Cell. In some conventional networks, a P(S) Cell may use a PDCCH carrying a DCI to schedule a PDSCH or PUSCH for an S Cell, or an S Cell may use a PDCCH carrying a DCI to schedule a PDSCH or PUSCH for another S Cell. However, in conventional networks, the S Cell cannot use a DCI to schedule transmission using the PDSCH or PUSCH on the P(S) Cell.

The aspects of the disclosure describe a cross-carrier scheduling scheme that uses a PDCCH carrying a single DCI of the S Cell for cross-carrier scheduling of PDSCH or PUSCH on the P(S) Cell. The aspects of the disclosure also describe a joint-carrier scheduling scheme that uses a PDCCH carrying a single DCI of the P(S) Cell or S Cell for scheduling data transmission using a PDSCH or PUSCH on the P(S) Cell and S Cell. In some instances, the number of cells that may be scheduled may be limited by a cell threshold, such as two. In other instances, the aspects limit and/or constrain an increase in the DCI size due to joint-carrier scheduling scheme.

The cross-carrier scheduling scheme and joint-carrier scheduling scheme may be beneficial in networks that implement a dynamic spectrum sharing (DSS) technique, such as NR networks. In the DSS technique, an LTE cell and an NR cell may share frequency spectrum that may be dynamically allocated to an LTE cell or a NR cell based on need. For example, suppose a frequency spectrum is allocated to an LTE cell. However, a NR cell may also require the frequency spectrum to schedule a PDCCH with a DCI that schedules data on PDSCH or PUSCH used by the NR cell. In this case, a non-DSS cell can use a cross-carrier scheduling scheme to transmit a DCI in the PDCCH to schedule PDSCH or PUSCH for the NR cell. In another example, a non-DSS cell can use a joint-carrier scheduling scheme and transmit a DCI in the PDCCH of the non-DSS Cell to schedule PDSCH or PUSCH for the NR cell and the non-DSS Cell.

Figure 2A:
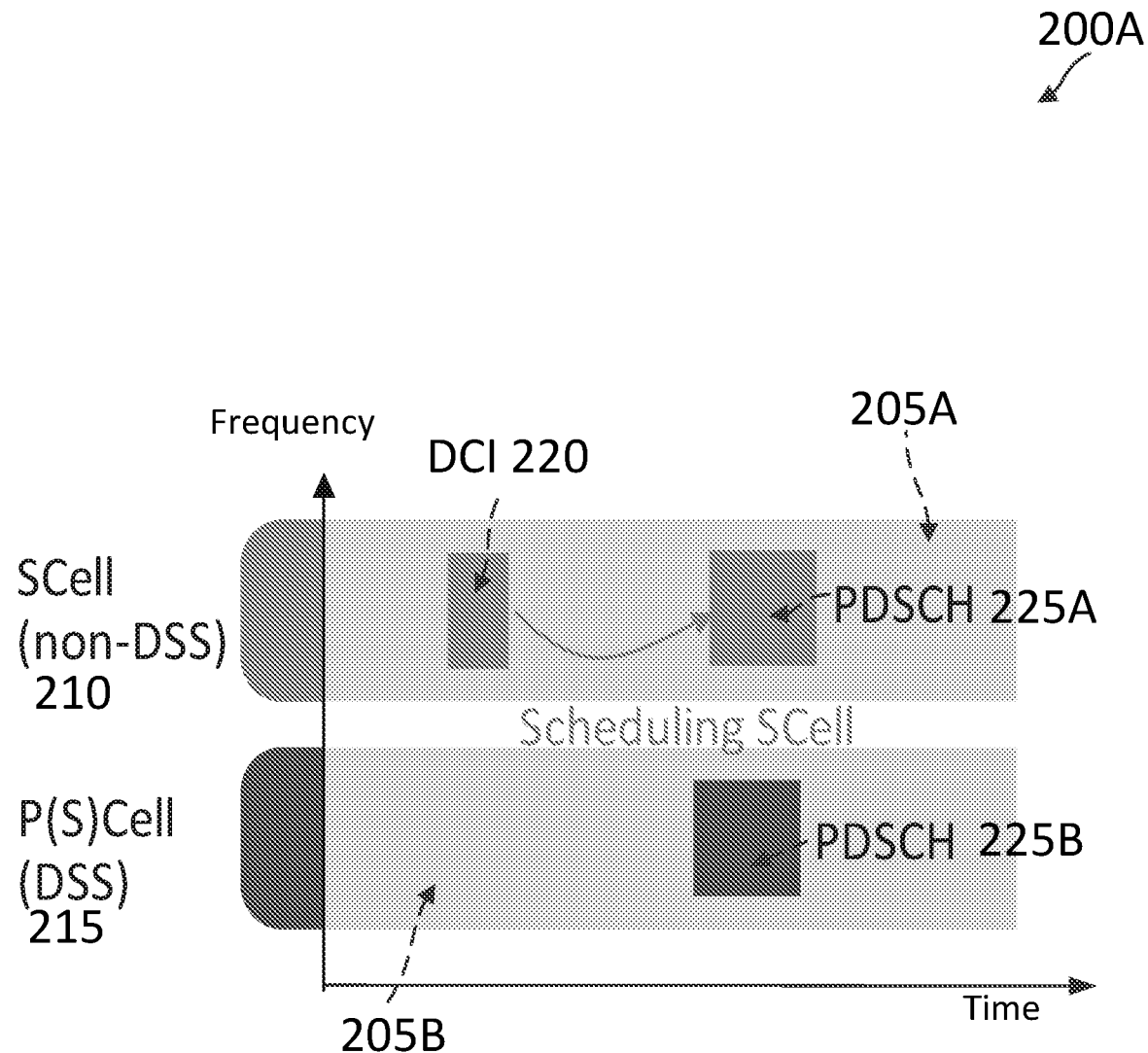
FIGS. 2A-2C illustrate same-carrier, cross-carrier, and joint-carrier scheduling schemes according to some aspects of the disclosure.

FIG. 2A is a diagram 200A illustrating a same-carrier scheduling scheme according to the aspects of the disclosure. FIG. 2A illustrates a frequency spectrum 205A and 205B. Frequency spectrum 205A is associated with a S Cell 210 and frequency spectrum 205B is associated with a P(S) Cell 215. Frequency spectrum 205A may include one or more carriers that transmit control information and data associated with the S Cell 210. Frequency spectrum 205B may include one or more carriers that transmit control information and data associated with the P(S) Cell 215. S Cell 210 may be a non-DSS cell, and P(S) Cell may be a DSS cell, according to aspects of the disclosure though the implementation is not limited to this embodiment. As illustrated in FIG. 2A, when S Cell 210 is a scheduling cell, the PDCCH carries DCI 220 in the frequency spectrum 205A to schedule the PDSCH 225A or PUSCH (not shown) in frequency spectrum 205A used by the S Cell 210.

Figure 2B:
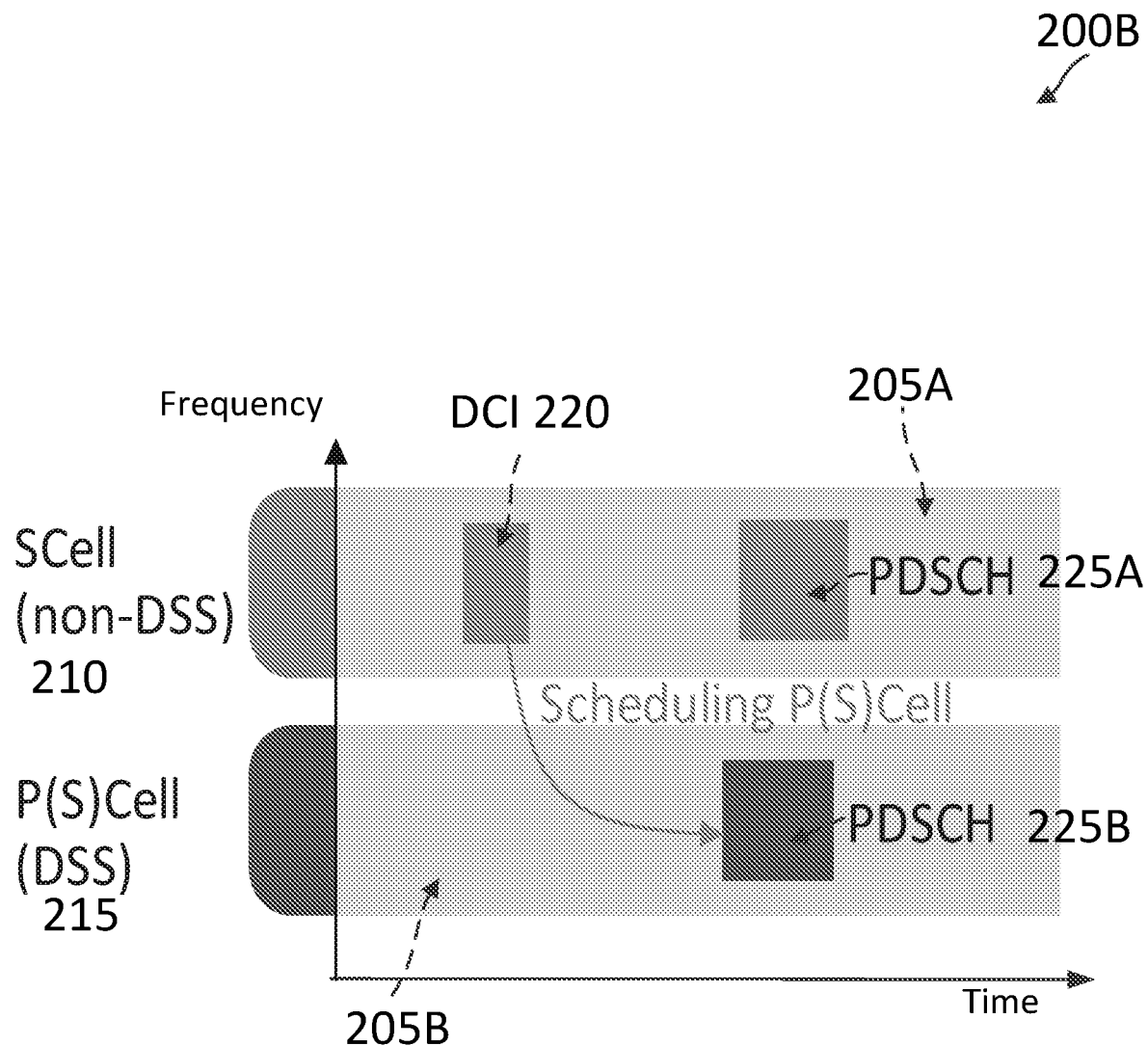

FIG. 2B is a diagram 200B illustrating a cross-carrier scheduling technique according to the aspects of the disclosure. FIG. 2B illustrates a frequency spectrum 205A and 205B. Like in FIG. 2A, frequency spectrum 205A is associated with the S Cell 210 and frequency spectrum 205B is associated with a P(S) Cell 215. Also like in FIG. 2A, frequency spectrum 205A may include one or more carriers that transmit control information and data associated with S Cell 210 and frequency spectrum 205B may include one or more carriers that transmit control information and data associated with P(S) Cell 215. S Cell 210 may be a non-DSS cell, and P(S) Cell may be a DSS cell, according to non-limiting aspects of the disclosure. As illustrated in FIG. 2B, the PDCCH of the S Cell 210 carries DCI 220 in frequency spectrum 205A for cross-carrier scheduling of data for transmission using the PDSCH 225B or PUSCH (not shown) of the P(S) Cell 215. Notably, because DCI 220 schedules PDSCH 225B or PUSCH in P(S) Cell 215, the PDSCH 225B or PUSCH are transmitted using frequency spectrum 205B.

Figure 2C:
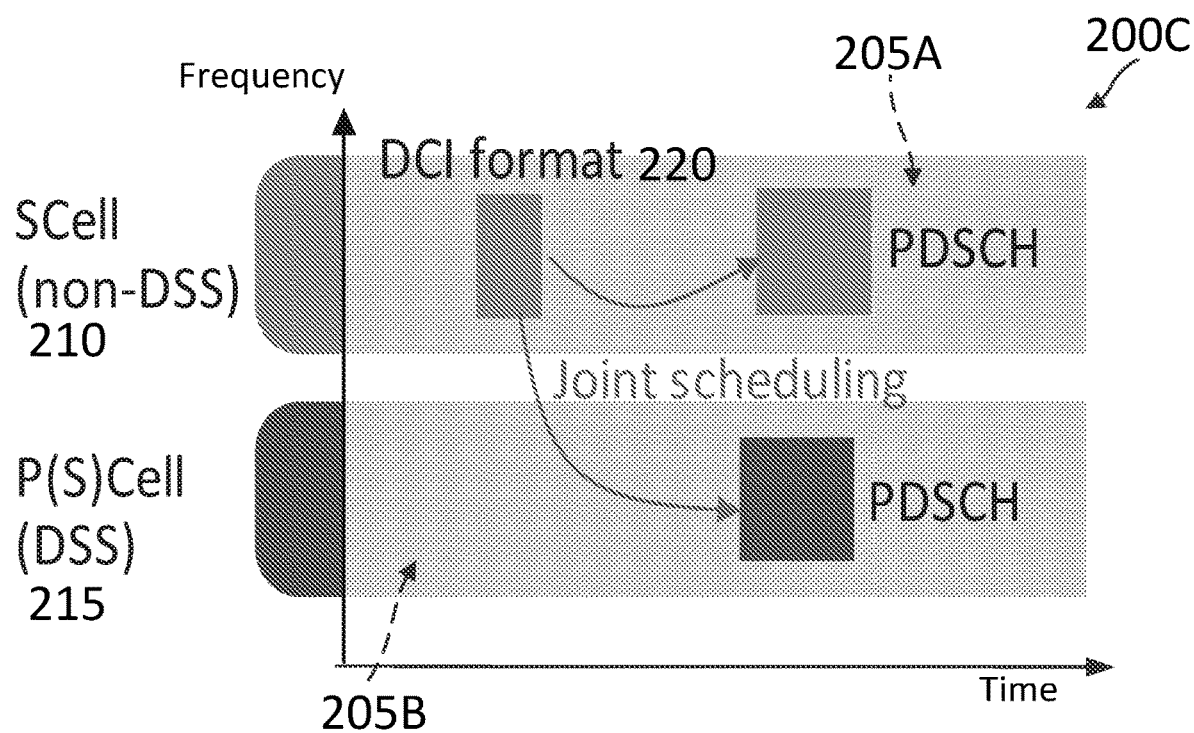

FIG. 2C is a diagram 200C illustrating a joint-carrier scheduling scheme according to the aspects of the disclosure. Like in FIGS. 2A-B, FIG. 2C also illustrates a frequency spectrum 205A and 205B, where frequency spectrum 205A is associated with the S Cell 210 and frequency spectrum 205B is associated with the P(S) Cell 215. Frequency spectrum 205A may include one or more carriers that transmit control information and data associated with the S Cell 210 and frequency spectrum 205B may include one or more carriers that transmit control information and data associated with the P(S) Cell 215. S Cell 210 may be a non-DSS cell, and P(S) Cell 215 may be a DSS cell, according to non-limiting aspects of the disclosure. As illustrated in FIG. 2C, the PDCCH of the S Cell 210 may carry DCI 220 using frequency spectrum 205A for joint-carrier scheduling of the PDSCH 225A on S Cell 210 and PDSCH 225B for P(S) Cell 215. Notably, the PDSCH 225A is transmitted using frequency spectrum 205A and PDSCH 225B is transmitted using frequency spectrum 205B. Further, the aspects are not limited to the PDSCHs 225A-B and can also be used to schedule data using PUSCH on both the S Cell 210 and P(S) Cell 215. Although not shown, P(S) Cell 215 can also use the joint-carrier scheduling technique and use the PDCCH carrying a DCI of the P(S) Cell 215 to schedule data on the PDSCH 225A and PDSCH 225B (or on PUSCHs).

In some aspects, to schedule data using the DCI 220 to perform same-carrier, cross-carrier or joint-carrier scheduling schemes, BS 105 of the S Cell 210 may transmit a PDCCH that includes DCI 220 to one or more UE 115 operating in the S Cell 210 or P(S) Cell 215. The DCI 220 may include a dedicated field and value(s) that indicates that DCI 220 schedules PDSCHs on the same cell in cells 210, 215, across cells 210, 215 or on multiple cells 210, 215 (also referred to as the set of cells 210, 215). In some instances, for DCIs 220 that have non-fallback DCI formats (e.g., DCI formats 0_1, 0_2, 1_1, and/or 1_2) the value may be stored in a carrier indicator field (CIF). For DCIs that have fallback DCI formats (e.g., DCI formats 0_0 and/or 1_0), the value may be stored in another dedicated field. Notably, the CIF in the conventional networks may not be configured such that the DCI in a S Cell schedules PDSCH or PUSCH in a PS Cell, such as in the cross-carrier scheduling scheme discussed in FIG. 2B or in the joint-carrier scheduling scheme discussed in FIG. 2C. In some instances, CIF=0 corresponds to a cross-carrier scheduling scheme where S Cell 210 schedules data on the P(S) Cell 215, CIF=1 corresponds to a same-carrier scheduling scheme where S Cell 210 schedules data on the S Cell 210, and CIF=2 corresponds to a joint-carrier scheduling where S Cell 210 schedules data on both P(S) cell 215 and S Cell 210. Notably, the aspects below discuss the S Cell 210 as the scheduling cell for the joint-carrier scheduling scheme, however, the aspects may also apply to the P(S) Cell 215 being the scheduling cell in the joint-carrier scheduling scheme.

As discussed above, BS 105 may transmit a PDDCH to UE 115 that carries a DCI 220. The PDCCH may be transmitted in the PDCCH region in a DL frame of one or more carriers. The PDCCH region may have many places where a specific PDCCH is located and UE 115 may search the PDCCH region for the possible locations. A set of possible locations for the PDCCH may be referred to as a search space and each of the possible locations may be referred as a PDCCH candidate. For optimization purposes, the search space may be further constrained by a set of control channel element (CCE) locations. The CCE locations may include a subset of PDCCH candidates from which UE 115 may identify PDCCHs. One or more CCE locations may also be aggregated according to an aggregation level. The aggregation level, e.g. 1, 2, 4, or 8, may indicate a number of CCEs that may include a PDCCH.

In some aspects, the association between a CIF value and the same-carrier, cross-carrier, or joint-carrier scheduling scheme may be configured using dedicated RRC signaling. The BS 105 may transmit the RRC signal that includes values for some all variables in the Equation 1 below. The Equation 1 determines an index of CCE of a PDCCH candidate so that the UE 115 monitoring the PDCCH can identity where the PDCCH candidate that includes the PDCCH:

$$L \cdot \left\{ \left( Y_{p,n_{sf}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \qquad \text{Equation 1}$$

In Equation 1, L is an aggregation level of the given PDCCH candidate, such as 1, 2, 4, 8, or 16; index i is the index of the CCE among aggregation level L CCEs for the given PDCCH candidate; $Y_{p,n_{sf}^{\mu}}$ is a hash function, where the value of the hash function for a common search space (CSS) is fixed at zero, and for UE-specific search space (USS) the value of the hash function depends on the RNTI and slot index; the $N_{CCE,p}$ is the number of CCEs for the given CORESET p; $M_{s,max}^{(L)}$ is a number of the PDCCH candidates for the given aggregation level L in the search space s; index $m_s$ is an index of the PDCCH candidate among $M_{s,mac}^{(L)}$ PDCCH candidates; and $n_{CI}$ corresponds to the value in the CIF. Because the CIF value is different for the same-carrier, cross-carrier, and joint-carrier scheduling schemes, the value of $n_{CI}$ is also different. Because the value of $n_{CI}$ is different, the Equation 1 above may generate a different index for the CCE for each of the same-carrier, cross-carrier, and joint-carrier scheduling schemes, which means Equation 1 also generates different PDCCH candidates that include the PDCCH that is associated with the same-carrier, cross-carrier, and multi-carrier scheduling schemes.

Figure 3:
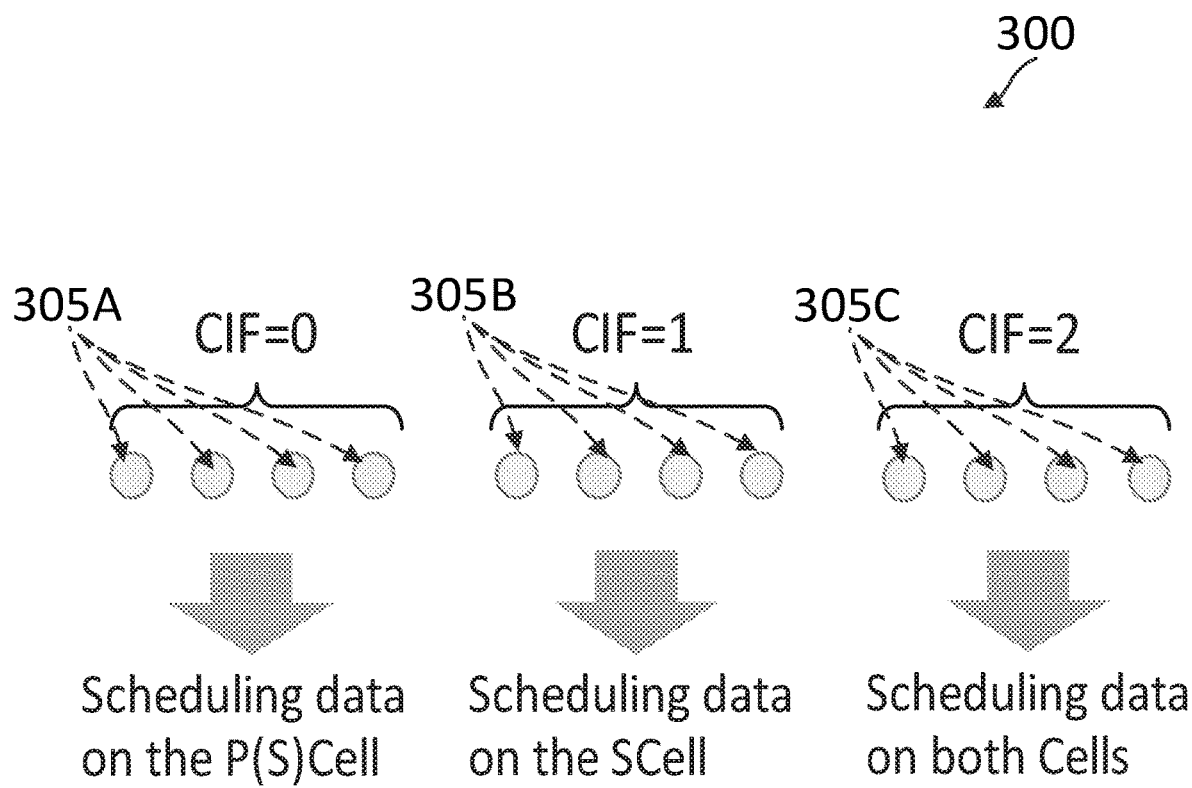
FIG. 3 illustrates physical downlink control channel (PDCCH) candidates that schedule data using the same-carrier, cross-carrier, and joint-carrier scheduling schemes, according to some aspects of the disclosure.

In some aspects, the CIF value corresponds to different PDCCH candidates for non-fallback DCI formats. FIG. 3 is a diagram 300 that illustrates different PDCCH candidates that correspond to different CIF values, according to some aspects of the disclosure. For example, CIF=0 corresponds to a first set of PDCCH candidates 305A, CIF=1 corresponds to a second set PDCCH candidates 305B, and CIF=2 corresponds to a third set of PDCCH candidates 305C. The PDCCH candidates in sets 305A-C may belong to the same search space that UE 115 may monitor. Although the number of PDCCH candidates in each of the PDCCH candidate sets 305A-305C is shown as four in FIG. 3, the aspects are not limited to this embodiment, and there may be a different number of the PDCCH candidates in each of the sets 305A-305C. Further, the PDCCH candidates in sets 305A, 305B, and 305C may be in different locations within the PDCCH region.

In one aspect of the disclosure, the number(s) of the PDCCH candidates in sets 305A-305C may be configured using the RRC signaling. For example, the number(s) of the PDCCH candidates per aggregation level for non-fallback DCI formats with the CIF value corresponding to scheduling PDSCHs on multiple serving cells (CIF=2) is configured by the RRC signaling. For example, the number of the PDCCH candidates in set 305C may be included as part of SearchSpace, PDCCH-Config, crossCarrierSchedulingConfig, or any other signals in the RRC signaling. The number(s) of the PDCCH candidates per aggregation level for the non-fallback DCI formats with CIF values corresponding to the same-carrier and joint-carrier scheduling schemes may also be configured independently using the RRC signaling. In this case, the number of the PDCCH candidates in set 305C may configured independently from the number of PDCCH candidates in sets 305A or 305C, and may be different from the number of the PDCCH candidates in sets 305A and/or 305B. The non-fallback DCI formats may be DCI format 1_1 or 1_2 for scheduling the PDSCH and DCI format 0_1 or 0_2 for scheduling PUSCH, while fallback DCI formats may be DCI format 0_0 and DCI format 1_0. For fallback DCI formats other signals or fields in the RRC may be used to configure the numbers of PDCCH candidates.

In another aspect of the disclosure, the number(s) of PDCCH candidates per aggregation level for non-fallback DCI formats with the CIF value corresponding to scheduling PDSCHs on multiple serving cells (CIF=2) is the same number as the CIF value corresponding to scheduling a PDSCH on one of the serving cells (CIF=0 or CIF=1). For example, the number of PDCCH candidates in set 305C that corresponds to the CIF=2 is the same as the number of PDCCH candidates in the set 305A that corresponds to CIF=0. Thus, if the number of PDCCH candidates in set 305A is three, then the number of PDCCH candidates in set 305C is also three. In another example, the number of PDCCH candidates in set 305C that corresponds to the CIF=2 is the same as the number of PDCCH candidates in the set 305B that corresponds to CIF=1. Thus, if the number of PDCCH candidates in set 305A is five, then the number of PDCCH candidates in set 305C is also five.

As discussed above, the number of the PDCCH candidates that may be used for the same-carrier, cross-carrier, and joint-carrier scheduling schemes may be configured using RRC signaling. In this case, BS 105 configures the RRC signaling and transmits the RRC signaling to the UE 115. The UE 115 parses the RRC signaling and monitors the number of PDCCH candidates for the same-carrier, cross-carrier, and joint carrier scheduling schemes as indicated in the RRC signaling.

As discussed above, a set of PDCCH candidates that the UE 115 may monitor is defined in terms of PDCCH search space sets. A search space set can be a common search space set or a UE-specific search space set. In some instances, the PDCCH candidates that carry the DCI for the joint-carrier scheduling scheme may share the search space set with the PDCCH candidates that carry the DCI for the same-carrier scheduling scheme and cross-carrier scheduling scheme. For example, UE 115 may be configured for operation with carrier aggregation and may indicate search space sharing through one or more parameters. Example parameters may be searchSpaceSharingCA-UL or searchSpaceSharingCA-DL in the RRC. If the UE 115 indicates support for search space sharing, UE 115 may also support search space sharing for the PDCCH candidates associated with a multi-cell scheduling $n_{CI}$. For example, suppose UE 115:

Is configured for operation with carrier aggregation, and indicates support for search space sharing through one or more parameters, such as the searchSpaceSharingCA-UL or searchSpaceSharingCA-DL, and has a PDCCH candidate with CCE aggregation level L in CORESET p for DCI format 0_1 or a DCI format 1_1, having a first size and associated with serving cell $n_{CI,2}$.

Then, UE 115 can receive a corresponding PDCCH through a PDCCH candidate with CCE aggregation level L in CORESET p for a DCI format 0_1 or a DCI format 1_1, respectively, having a second size and associated with serving cell $n_{CI,1}$ if the first size and the second seize are the same. Further if the UE 115 satisfies the above conditions, the UE 115 may also receive the DCI scheduling data on the P(S) Cell 215 or S Cell 210 on a PDCCH candidate associated with CIF=2. Additionally, if the UE 115 satisfies the above conditions, the UE 115 may receive the DCI scheduling data on both S Cell 210 or P(S) Cell 215 on a PDCCH candidate associated with CIF=0 or CIF=1.

In conventional networks, the UE 115 monitors PDCCH candidates for up to a configurable number of sizes of DCI formats. Example size of DCI formats may be four. Some of these DCI format sizes, e.g. three sizes of the DCI formats, may have a CRC scrambled by a C-RNTI per serving cell. As UE 115 monitors for PDCCH candidates, the UE 115 may count a number of size of the DCI formats per serving cell based on a number of configured PDCCH candidates in respective search space sets for the corresponding active DL BWP.

As discussed above, in network 100, UE 115 may be configured with a joint-carrier scheduling scheme where a single DCI to schedule data on multiple serving cells, e.g. the DCI of the S Cell 210 schedules data on S Cell 210 and P(S) Cell 215. As part of the joint-carrier scheduling scheme, the UE 115 may be configured to monitor and count a number of DCI format sizes.

In a first aspect, the UE 115 may monitor the PDCCH candidates for up to a first configurable number of DCI format sizes, e.g. four sizes. Out of these DCI formats sizes, up to a second configurable number of sizes, e.g. three sizes, may be CRC scrambled by C-RNTI. The total number of DCI format sizes that the UE 115 may monitor per serving cell may include the number of DCI formats that schedule data on a serving cell and per CIF value for DCI formats that schedule data on multiple serving cells. The UE 115 may also count a number of sizes for DCI formats per serving cell for DCI formats that schedule data on a serving cell and per CIF value for DCI formats that schedule data on multiple serving cells based on a number of configured PDCCH candidates in the respective search space sets for corresponding active DL BWP. For example, the UE 115 may monitor and count the PDCCH candidates for up to four sizes of DCI formats for the communication on the serving cell corresponding to CIF=0. In another example, UE 115 may monitor and count the PDCCH candidates for up to four sizes of DCI formats for the communication on the serving cell corresponding to CIF=1. In yet another example, UE 115 may monitor and count the PDCCH candidates for up to four sizes of DCI formats for the communications on the serving cells corresponding to CIF=2. In some aspects, there may be a dedicated number of DCI format sizes, e.g. three or four sizes, that are available for DCIs that schedule data on multiple serving cells. Accordingly, in an embodiment, where the CIF has three values that identify the same-carrier scheduling scheme, cross-carrier scheduling scheme, and joint-carrier scheduling scheme, and where each scheme corresponds to four sizes of DCI formats, that UE 115 may monitor up to 12 different sizes of the DCI formats.

In a second aspect, the number of sizes of the DCI formats that UE 115 may monitor may not increase with the joint-carrier scheduling scheme. This is because, the size of the DCI for scheduling data on multiple serving cells, may be aligned with the size of the DCI scheduling data on one of the serving cells. For example, the number of DCI format sizes in the joint-carrier scheduling scheme shown in FIG. 2C may be aligned with the number of DCI format sizes used by the same-carrier scheduling scheme shown in FIG. 2A or by the cross-carrier scheduling scheme shown in FIG. 2B. In this case, if the same-carrier scheduling scheme uses up to four DCI format sizes then the joint-carrier scheduling scheme may also use up to four DCI format sizes. Alternatively, if the cross-carrier scheduling scheme uses up to three DCI format sizes then the joint-carrier scheduling scheme may also use up to three DCI format sizes.

In a third aspect, there may be a configurable number of DCI format sizes, e.g. four DCI format sizes, that may be used across same-carrier, cross-carrier, and joint-carrier scheduling schemes. In this case, when UE 115 is configured with a DCI scheduling data on multi serving cells, the size of the DCI formats is independent of the value of the CIF. Instead, the size of each field in the DCI is determined as a function of configurations across all CCs that can be individually or jointly scheduled by the scheduling cell. For example, if the number of DCI format sizes is limited to a configurable number, e.g. four DCI format sizes, then these four DCI format sizes may be used by the same-carrier, cross-carrier, and joint-carrier scheduling schemes.

In some aspects, a number of PDCCH candidates and a number of non-overlapping CCEs per slot that UE 115 may monitor is defined per scheduling cell. In network 100, UE 115 is configured to monitor $N_{cells}^{DL,u}$ downlink cells and sets of downlink cells scheduled by a DCI with active DL BWPs using SCS configuration u where $\Sigma_{u=0}^{3} N_{cells}^{DL,u} \leq N_{cells}^{cap}$. The N includes the number of downlink cells and the number of set(s) of downlink cells where data can be scheduled by one DCI. In other words, the set of downlink cells scheduled using the joint-carrier scheduling scheme can be treated as one value in $N_{cells}^{DL,u}$. The UE 115 may not be required to monitor, on the active DL BWP of the scheduling cell, more than $M_{PDCCH}^{total,slot,u} = M_{PDCCH}^{max,slot,u}$ PDCCH candidates or more than $C_{PDCCH}^{total,slot,u} = C_{PDCCH}^{max,slot,u}$ non-overlapping CCEs per slot for each scheduled cell or each set of downlink cells scheduled by a DCI.

In network 100, if UE 115 is configured with $N_{cells}^{DL,u}$ downlink cells and set of downlink cells scheduled by a DCI with active DL BWPs using SCS configuration u where $\Sigma_{u=0}^{3} N_{cells}^{DL,u} \leq N_{cells}^{cap}$, the UE 115 may not be required to monitor, on the active DL BWP of the scheduling cell more than $$M_{PDCCH}^{total,slot,u} = \left\lfloor \frac{N_{cells}^{cap} M_{PDCCH}^{max,slot,u} N_{cells}^{NDL,u}}{\sum_{j=0}^{3} N_{cells}^{DL,j}} \right\rfloor$$

PDCCH candidates or more than $$C_{PDCCH}^{total,slot,u} = \left\lfloor \frac{N_{cells}^{cap} C_{PDCCH}^{max,slot,u} N_{cells}^{NDL,u}}{\sum_{j=0}^{3} N_{cells}^{DL,j}} \right\rfloor$$

non-overlapping CEEs per slot for each scheduled cell or each set of downlink cells scheduled by the DCI. Accordingly, the number of PDCCH candidates (M) and the number of non-overlapping CCEs (C) that UE 115 may monitor may depend on N which is the number of scheduled cells and the set of downlink cells that were scheduled using the joint-carrier scheduling scheme. For example, with reference to the same-carrier scheduling, cross-carrier scheduling, and multi-carrier scheduling in FIGS. 2A-2C, N=3.

Figure 4:
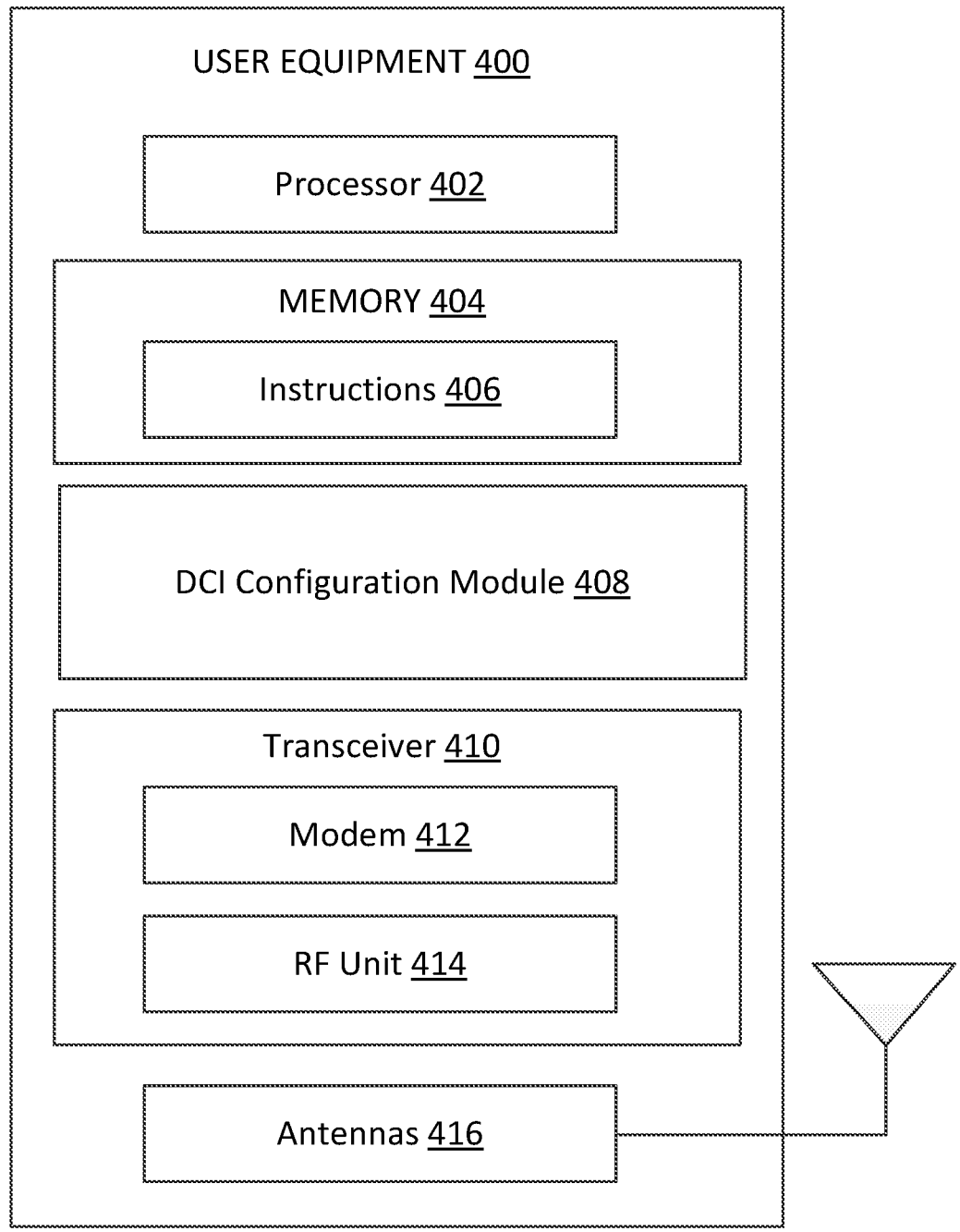
FIG. 4 is a block diagram of a user equipment according to some aspects of the disclosure.

In some aspects of the disclosure, UE 115 may be configured to store DL and UL DCIs for a scheduled cell. For example, when a cell or a set of cells are scheduled using a DCI, UE 115 may receive up to a configurable number of PDCCHs, e.g. up to 16 PDCCHs, for DCI formats 1_0 and 1_1. For example, UE 115 may receive up to 16 PDCCHs for DCI formats 1_0 or 1_1 with the CRC scrambled by C-RNTI, CS-RNTI, or MCS-RNTI. The PDCCHs for DCI formats 1_0 and 1_1 may schedule up to a configurable number of PDSCHs, e.g. up to 16 PDSCHs receptions for which the UE 115 may not have received any corresponding PDSCH symbol. In another example, UE 115 may also receive up to 16 PDCCHs for DCI formats 0_0 or 0_1 with the CRC scrambled by C-RNTI, CS-RNTI, or MCS-RNTI, where the 16 PDCCHs schedule 16 PUSCH transmissions for which the UE has not transmitted a corresponding PUSCH symbol. The algorithm for UE 115 receiving and storing a number of DCI is as follows:

if UE 115:
is not configured for an NR-DC operation and indicates through pdcch-BlindDetectionCA a capability to monitor PDCCH candidates for $N_{cells}^{cap} \geq 4$ downlink cells and sets of downlink cells scheduled by a DCI, and the UE 115 is configured with $N_{cells}^{DL} \geq 4$ downlink cells and sets of downlink cells scheduled by a DCI or $N_{cells}^{UL} \geq 4$ uplink cells and sets of uplink cells scheduled by a DCI, or is configured with NR-DC operation and for a cell group $N_{cells}^{DL} \geq 4$ downlink cells and sets of downlink cells scheduled by a DCI or $N_{cells}^{UL} \geq 4$ and sets of uplink cells scheduled by a DCI, the UE 115 may expect to receive at most a configurable number of $N_{cells}^{cap}$ (e.g. $16 N_{cells}^{cap}$) for the following formats:

DCI formats 1_0, 1_1, or 1_2 with the CRC scrambled by a C-RNTI, or a CS-RNTI, or a MCS-C-RNTI scheduling $16 N_{cells}^{cap}$ PDSCH receptions for which the UE 115 has not received any corresponding PDSCH symbol over all $N_{cells}^{DL}$ downlink cells and sets of downlink cells scheduled by a DCI, and DCI formats 0_0, 0_1, or 0_2 with CRC scrambled by a C-RNTI, or a CS-RNTI, or a MCS-C-RNTI scheduling $16 N_{cells}^{cap}$ PUSCH transmissions for which the UE has not transmitted any corresponding PUSCH symbol over all $N_{cells}^{UL}$ uplink cells and sets of uplink cells scheduled by a DCI FIG. 4 is a block diagram of a UE 400 according to some aspects of the present disclosure. The UE 400 may be a UE 115 discussed above in FIG. 1. As shown, the UE 400 may include a processor 402, a memory 404, a DCI configuration module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 6-8. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The DCI configuration module 408 may be implemented via hardware, software, or combinations thereof. The DCI configuration module 408 may be implemented as a processor, circuit, and/or instructions 406 stored in the memory 404 and executed by the processor 402. In some instances, the DCI configuration module 408 can be integrated within the modem subsystem 512. The DCI configuration module 408 can be implemented by a combination of software components (e.g., executed by a DSP or a general processor) and hardware components (e.g., logic gates and circuitry) within the modem subsystem 412.

The DCI configuration module 408 may identity the PDCCH that carries the DCI that UE 115, 400 receives from BS 105. Based on the CIF value in the DCI, the DCI configuration module 408 may determine whether the DCI schedules the PDSCH using the same-carrier scheduling scheme, cross-carrier scheduling scheme or joint-carrier scheduling scheme. The DCI configuration module 408 may also identify parameter(s) in the RRC signaling that the UE 115 may use to identify the location of the PDCCH candidates that may include the PDCCH that carries the DCI in for same-carrier scheduling scheme, cross-carrier scheduling scheme or a multi-carrier scheduling scheme. The DCI configuration module 408 may also identify parameter(s) in the RRC signaling that UE 115, 400 may use to identify a number of the PDCCH candidates that may be used for the same-carrier scheduling scheme, cross-carrier scheduling scheme or joint-carrier scheduling scheme. The DCI configuration module 408 may also identify parameter(s) in the RRC signaling that indicate whether UE 115, 400 supports search space sharing and is enabled to identify a number of the PDCCH candidates that may be used for the same-carrier scheduling scheme, cross-carrier scheduling scheme or joint-carrier scheduling scheme. The DCI configuration module 408 may also identify parameter(s) in the RRC signaling that indicate the number of DCI format sizes that are available in for the same-carrier scheduling scheme, cross-carrier scheduling scheme or multi-carrier scheduling scheme. The DCI configuration module 408 may also identify parameter(s) in the RRC signaling that indicate the number of PDCCH candidates and the number of non-overlapping CCE candidates per slot that UE 115, 400 may be configured to monitor for each scheduling cell. The DCI configuration module 408 may also identify parameter(s) in the RRC signaling that indicate the number of DL or UL DCIs that UE 115, 400 may store per scheduled cell. The DCI configuration module 408 may be used for various aspects of the present disclosure, for example, aspects of FIGS. 1-3 and 6-8.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404. The RF unit 414 may be configured to process (e.g., perform analog to digital conversion or digital to analog conversion, etc.) modulated/encoded data (e.g., PSSCH data and/or PSCCH control information) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In some aspects, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
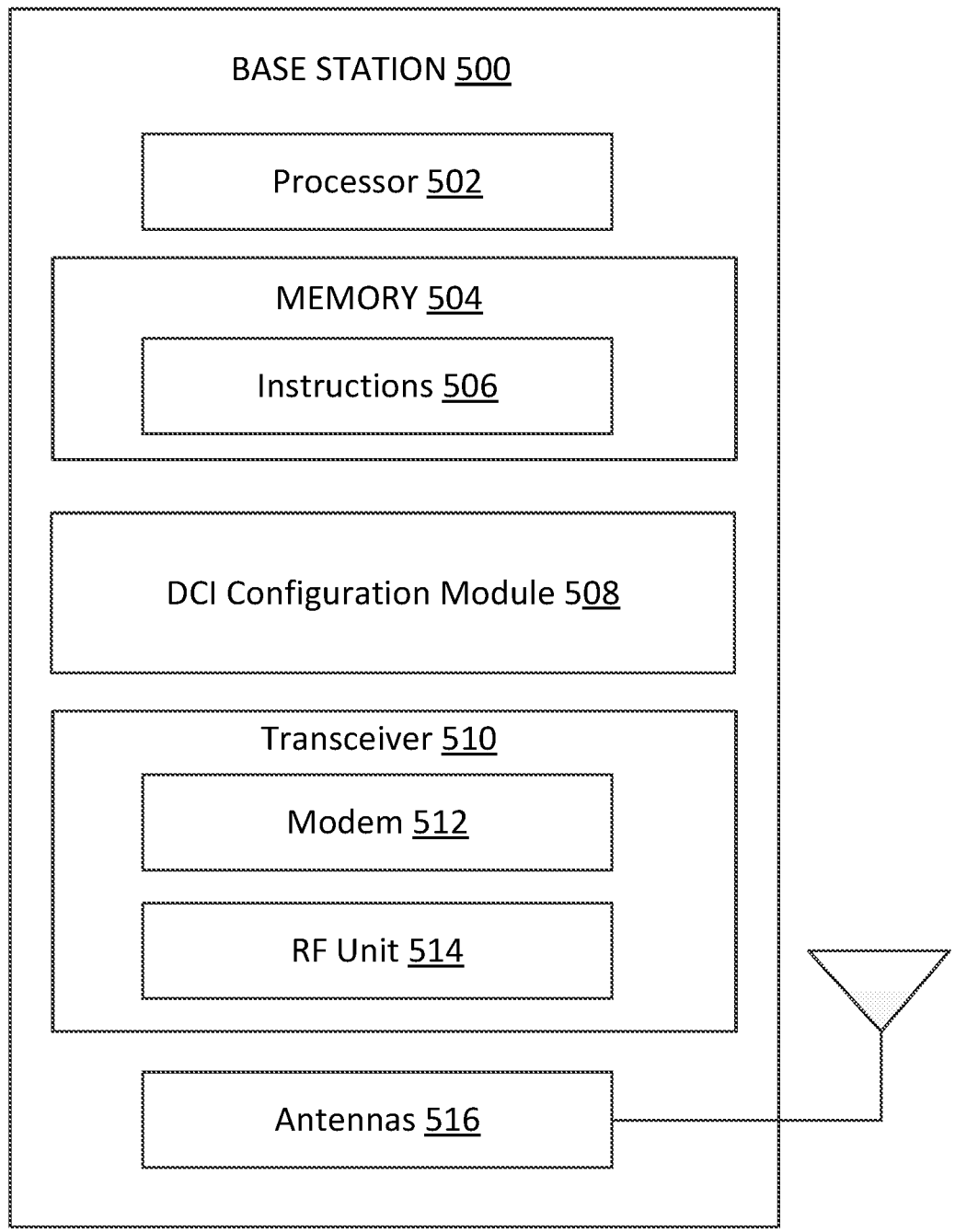
FIG. 5 is a block diagram of a base station according to some aspects of the disclosure.

FIG. 5 is a block diagram of a BS 500 according to some aspects of the present disclosure. The BS 500 may be a BS 105 as discussed above in FIG. 1. As shown, the BS 500 may include a processor 502, a memory 504, a DCI configuration module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-8. Instructions 506 may also be referred to as code, which may be interpreted broadly to include any type of computer-readable statement(s) as discussed above with respect to FIG. 4.

The DCI configuration module 508 may be implemented via hardware, software, or combinations thereof. The DCI configuration module 508 may be implemented as a processor, circuit, and/or instructions 506 stored in the memory 504 and executed by the processor 502. In some instances, the DCI configuration module 508 can be integrated within the modem subsystem 512. The DCI configuration module 508 can be implemented by a combination of software components (e.g., executed by a DSP or a general processor) and hardware components (e.g., logic gates and circuitry) within the modem subsystem 512.

The DCI configuration module 508 may be used for various aspects of the present disclosure, for example, aspects of FIGS. 1-3 and 6-8. The DCI configuration module 508 may be configured to transmit a PDCCH that carries a DCI to UE 115 for same-carrier, cross-carrier, and joint-carrier scheduling schemes. For example, DCI configuration module 508 may include a CIF in the DCI where CIF=0 indicates a cross-carrier scheduling scheme, CIF=1 indicates a same-carrier scheduling scheme, and CIF=2 indicates a joint-carrier scheduling scheme. The DCI configuration module 508 may also configure parameter(s) in the RRC signaling (or another signaling) that may identify the location of the PDCCH candidates that may include the PDCCH that carries the DCI in for the same-carrier scheduling scheme, cross-carrier scheduling scheme or joint-carrier scheduling scheme. The DCI configuration module 508 may also configure parameters in the RRC signaling that UE 115, 400 may use to identify a number of the PDCCH candidates that may be used for the same-carrier scheduling scheme, cross-carrier scheduling scheme or joint-carrier scheduling scheme. The DCI configuration module 508 may also configure parameter(s) in the RRC signaling that enable the UE 115 to supports search space sharing and identify a number of the PDCCH candidates that may be used for the same-carrier, cross-carrier or joint-carrier scheduling scheme. The DCI configuration module 508 may also configure the RRC signaling with the number of DCI format sizes that are available in for the same-carrier scheduling scheme, cross-carrier scheduling scheme or joint-carrier scheduling scheme. The DCI configuration module 508 may configure the parameter(s) in the RRC signaling with the number of PDCCH candidates and the number of non-overlapping CCE candidates per slot that UE 115, 400 may be configured to monitor for each scheduling cell. The DCI configuration module 508 may also configure parameter(s) in the RRC signaling that indicate the number of DL or UL DCIs that UE 115, 400 may store per scheduled cell.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., grants, resource allocations) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105, 500 to enable the BS 105, 500 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an example, the transceiver 510 is configured to transmit a TDD configuration by coordinating with the DCI configuration module 508. In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
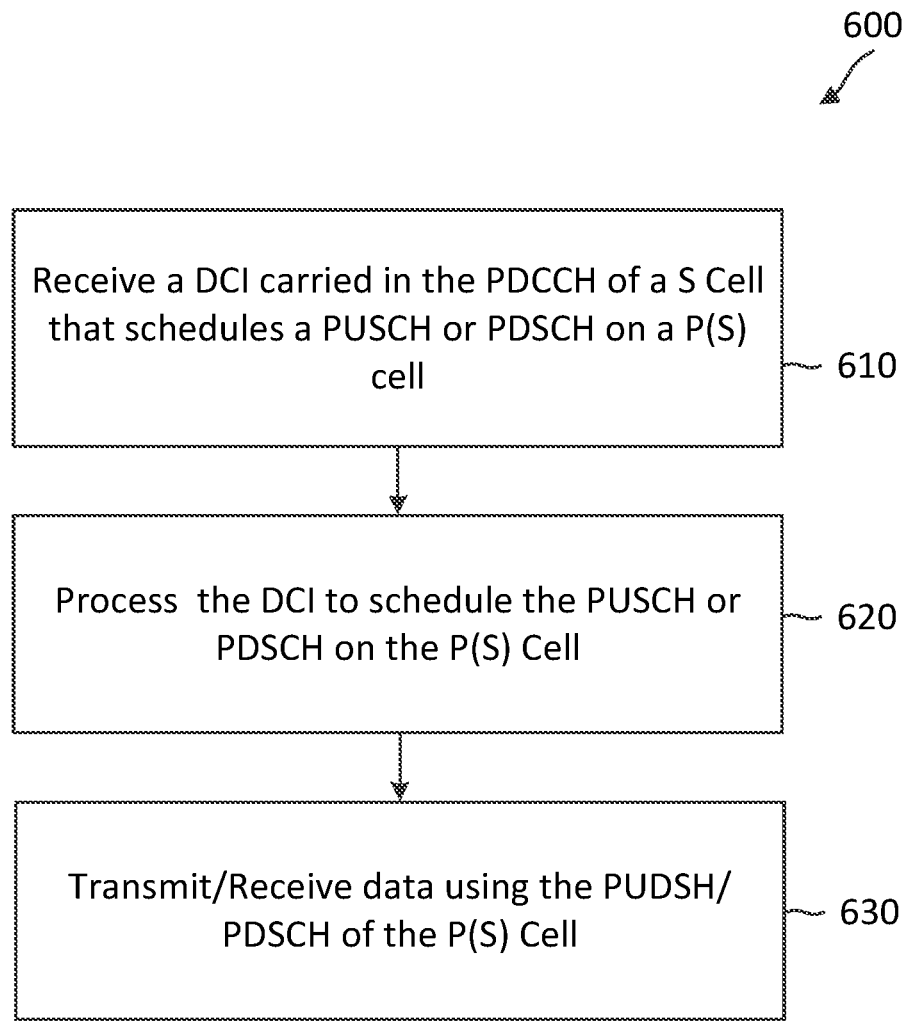
FIG. 6-8 are flow diagrams of a communication method according to some aspects of the present disclosure.

FIG. 6 is a flow diagram of a communication method 600 according to some aspects of the present disclosure. Steps of the method 600 can be executed by a computing device (e.g., a processor, processing circuit, and/or other suitable component) of a wireless communication device or other suitable means for performing the steps. For example, a wireless communication device, such as the UE 115 or the UE 400, may utilize one or more components, such as the processor 402, the memory 404, the DCI configuration module 408, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At step 610, the method 600 includes receiving, by a UE from a BS, a PDCCH that includes a DCI. For example, UE 115 may receive a PDCCH by monitoring a PDCCH candidate that includes a DCI 220. In some instances, DCI 220 may include a cross-carrier scheduling scheme, such as when a BS 105 of an S Cell 210 uses DCI 220 to schedule a PUSCH or PDSCH 225B on P (S) Cell 215.

At step 620, the method 600 including, processing the DCI received in step 610. For example, DCI configuration module 408 may identify the CIF in DCI 220 and determine that CIF=0. When the CIF=0, DCI configuration module 408 may determine that the DCI includes a cross-carrier scheduling scheme. As discussed above, in the cross-carrier scheduling scheme, the BS 105 of the S Cell 210 may schedule a PUSCH or PDSCH 225B from/to the UE 115 of the P (S) Cell 215.

At step 630, the method 600 includes transmitting or receiving, by the UE the data using the PUSCH or PUDSCH. For example, UE 115 may transmit or receive data on the PUSCH or PDSCH 225B using the frequency spectrum 205B of the P(S) Cell 215.

Figure 7:
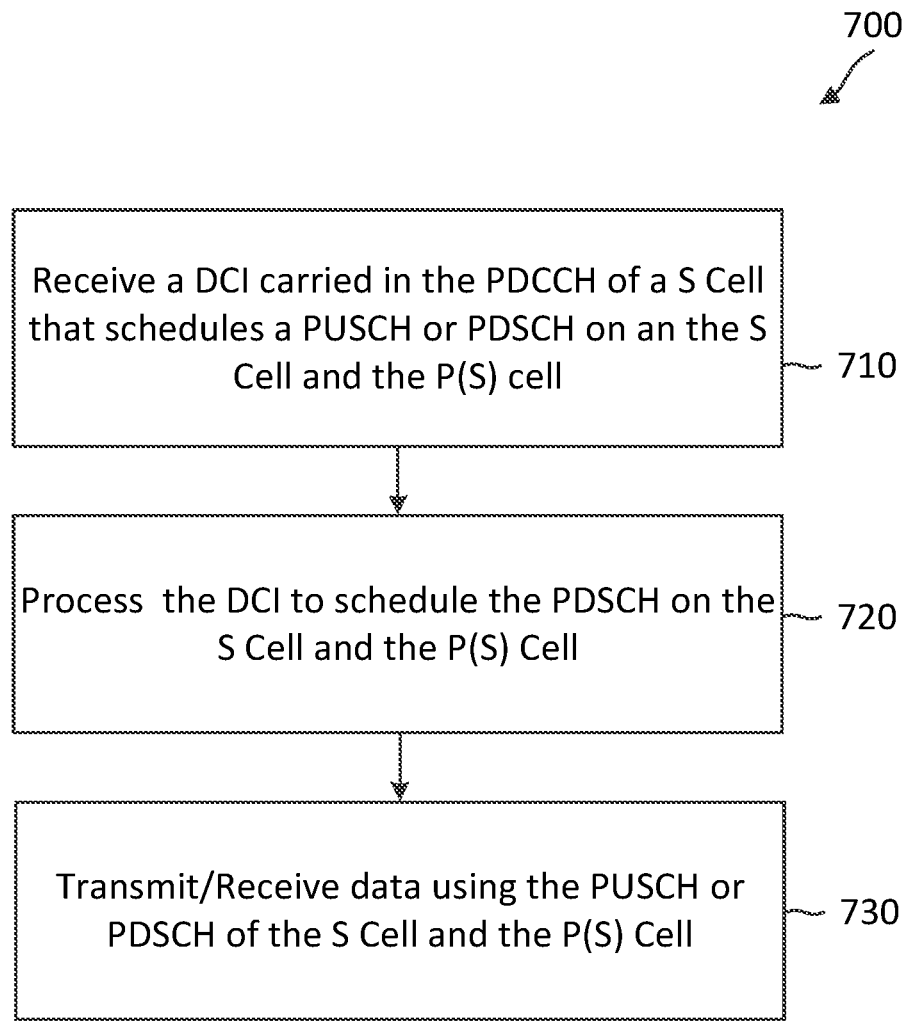

FIG. 7 is a flow diagram of a communication method 700 according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or the UE 400, may utilize one or more components, such as the processor 402, the memory 404, the DCI configuration module 408, the transceiver 410, the modem 412, and the one or more antennas 416, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At step 710, the method 700 includes receiving, by a UE from a BS, a PDCCH that includes a DCI. For example, UE 115 may receive a PDCCH by monitoring PDCCH candidates and identifying the PDCCH candidate that includes DCI 220. In some instances, DCI 220 may include a joint-carrier scheduling scheme, such as when a BS 105 of the S Cell 210 uses DCI 220 to schedule a PDSCH 225B on P (S) Cell 215 and PDSCH 225A on the S Cell 210. Although not discussed, the DCI may also include a joint-carrier scheduling scheme, such as when a BS 105 of an P(S) Cell 215 uses DCI 220 to schedule a PDSCH 225B on P (S) Cell 215 and PDSCH 225A on the S Cell 210.

At step 720, the method 700 including, processing the DCI received in step 710. For example, DCI configuration module 408 may identify the CIF in DCI 220 and determine that CIF=2. When the CIF=2, DCI configuration module 408 may determine that the DCI includes a joint-carrier scheduling scheme. As discussed above, in the joint-carrier scheduling scheme, the BS 105 of the S Cell 210 may schedule a PDSCH 225B on the P (S) Cell 215 and PDSCH 225A on the S Cell 210.

At step 730, the method 700 includes transmitting or receiving, by the UE the data using the PUSCH or PDSCH. For example, UE 115 may receive data on the PDSCH 225A using the frequency spectrum 205A of the S Cell 210 and receive data on the PDSCH 225B using the frequency spectrum 205B of the P(S) Cell 215. In another example, UE 115 may transmit data on the PUSCH using the frequency spectrum 205A of the S Cell 210 and transmit data on the PUSCH using the frequency spectrum 205B of the P(S) Cell 215.

Figure 8:
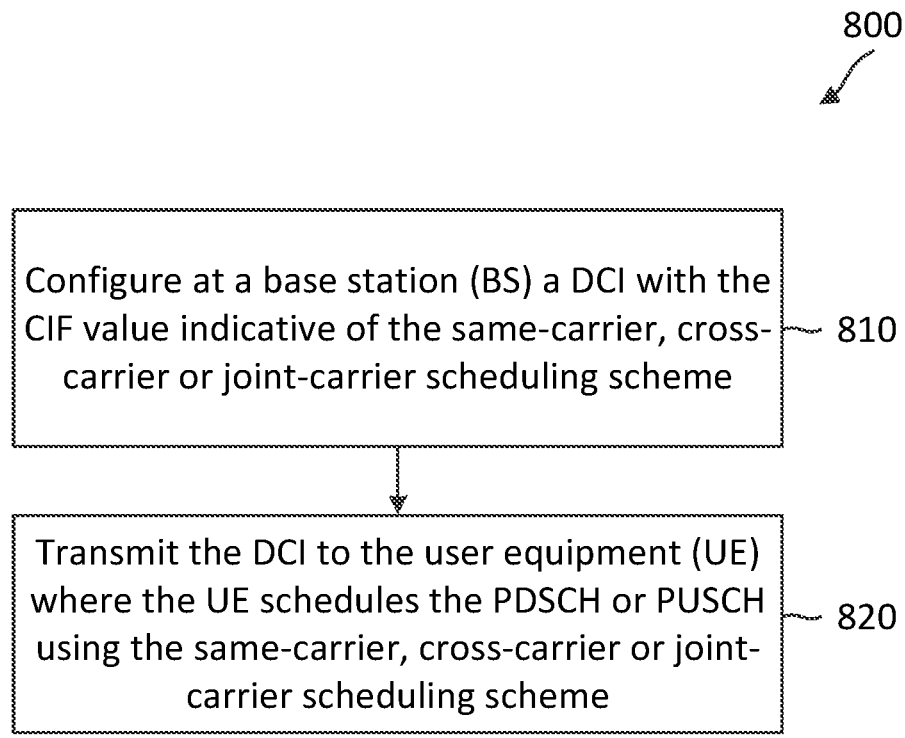

FIG. 8 is a flow diagram of a communication method 800 according to some aspects of the present disclosure. Steps of the method 800 can be executed by a computing device (e.g., a processor, processing circuit, and/or other suitable component) of a wireless communication device or other suitable means for performing the steps. For example, a base station, such as the BS 105 or, may utilize one or more components, such as the processor 502, the memory 504, the DCI configuration module 508, the transceiver 510, the modem 512, and the one or more antennas 516, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At step 810, the method 800 includes configuring, by a BS, a DCI. As discussed above, the DCI may include a CIF that indicates a same-carrier scheduling scheme (CIF=1), a cross-carrier scheduling scheme (CIF=0), and a joint-carrier scheduling scheme (CIF=2). In the same carrier scheduling scheme, the DCI 220 of the S Cell 210 may schedule data on the PDSCH 225A (or PUSCH) on the UE 115 that is communicating using the S Cell 210. In the cross-carrier scheduling scheme, the DCI 220 of an S Cell 210 may schedule PDSCH 225B (or PUSCH) on the UE 115 that communicates using the P(S) Cell 215. In the joint-carrier scheduling scheme, the DCI 220 of the S Cell 210 may schedule PDSCH 225A (or PUSCH) on the UE 115 that communicates within S Cell 210 and the same DCI may also schedule PDSCH 225B (or PUSCH) on the UE 115 that communicates using P (S) Cell 215. Notably, the aspects do not apply solely to the S Cell, as the aspects may also apply to the P(S) Cell 215.

At step 820, the method 800 includes transmitting, from the BS to the UE a DCI in the PDCCH. For example, BS 105 of the S Cell 210 may transmit the DCI with the CIF that is configured as discussed above to the UE 115.

In some instances, an apparatus comprises: means for receiving, from a base station (BS) of a first serving cell, a downlink control information (DCI) that indicates a joint-carrier scheduling scheme; and means for scheduling, using the joint-carrier scheduling scheme in the DCI, first data for communication on a first shared channel associated with the first serving cell and second data for communication on a second shared channel associated with a second serving cell. The apparatus may further comprise means for transmitting the first data using the first shared channel and the second data using the second shared channel. The apparatus may further comprise means for receiving the first data using the first shared channel and the second data using the second shared channel. In some instances, a carrier indicator field (CIF) in the DCI indicates the joint-carrier scheduling scheme. The apparatus may further comprise means for receiving a radio resource control (RRC) signal indicating a correspondence between a CIF value and the joint-carrier scheduling scheme. The apparatus may further comprise means for receiving a radio resource control (RRC) signal indicating a number of physical downlink control channel (PDCCH) candidates in a search space that include the DCI indicating the joint-carrier scheduling scheme. The apparatus may further comprise means for determining a number of PDCCH candidates associated with the DCI indicating the joint-carrier scheduling scheme based on a number of PDCCH candidates associated with a second DCI indicating a same-carrier scheduling scheme or a cross-carrier scheduling scheme. The apparatus may further comprise means for receiving the DCI indicating the joint-carrier scheduling scheme when the UE enables search space sharing using a DCI indicating a cross-carrier scheduling scheme. The apparatus may further comprise means for monitoring at least one PDCCH candidate in a search space set that carries the DCI for up to a configurable number of DCI format sizes when a CIF field indicates the joint-carrier scheduling scheme; and means for counting a number of the DCI formats sizes based on the at least one monitored PDCCH candidate in the search space set. The apparatus may further comprise means for determining a number of DCI format sizes for the joint-carrier scheduling scheme based on a number of DCI format sizes used for scheduling data on the first serving cell or a number of DCI format sizes used for scheduling data on the second serving cell. The apparatus may further comprise means for determining a DCI format size of the DCI as one of preconfigured DCI format sizes transmitted by the BS. The apparatus may further comprise means for determining a number of PDCCH candidates based on a number of downlink cells and a number of sets of downlink cells scheduled using the DCI; and means for monitoring up to the number of PDCCH candidates on an active downlink bandwidth parts (DL BWP) of the first serving cell. The apparatus may further comprise means for determining a number of control channel elements (CCEs) based on a number of downlink cells and a number of sets of downlink cells scheduled using the DCI; and means for monitoring up to the number of CCEs on an active downlink bandwidth parts (DL BWP) of the first serving cell. The apparatus may further comprise means for storing a configurable number of DCIs associated with the first serving cell and the second serving cell included in the joint-carrier scheduling scheme, wherein the configurable number of DCIs is associated with at least one of a physical downlink shared channel (PDSCH) transmission or a physical uplink shared channel (PUSCH) transmission.

In some instances, an apparatus comprises: means for configuring a joint-carrier scheduling scheme using a downlink control information (DCI), wherein in the joint-carrier scheduling scheme causes a first data to be communicated on a first shared channel associated with a first serving cell and second data to be communicated on a second shared channel associated with a second serving cell; and means for transmitting, to a user equipment (UE), the DCI that indicates the joint-carrier scheduling scheme. The apparatus may further comprise means for configuring a radio resource control (RRC) signal indicating a correspondence between a CIF value and the joint-carrier scheduling scheme. The apparatus may further comprise means for configuring a RRC signal indicating a number of physical downlink control channel (PDCCH) candidates in a search space set that can include the DCI indicating the joint-carrier scheduling scheme. The apparatus may further comprise means for configuring a number of PDCCH candidates associated with the DCI indicating the joint-carrier scheduling scheme based on a number of PDCCH candidates associated with a second DCI indicating a same-carrier scheduling scheme or a cross-carrier scheduling scheme. The apparatus may further comprise means for transmitting an RRC signal to the UE that enables search space sharing for a cross-carrier scheduling scheme or a same-carrier scheduling scheme; and means for configuring the DCI indicating the joint-carrier scheduling scheme when the RCC signal enables the search space sharing. The apparatus may further comprise: means for configuring a number of DCI format sizes for the joint-carrier scheduling scheme; and means for transmitting a PDCCH that includes the DCI in at least one of the DCI format sizes. The apparatus may further comprise means for configuring a number of DCI format sizes for the joint-carrier scheduling scheme based on a number of DCI format sizes used for scheduling data on the first serving cell or a number of DCI format sizes used for scheduling data on the second serving cell. The apparatus may further comprise means for determining a DCI format size of the DCI as one of preconfigured DCI format sizes. The apparatus may further comprise means for determining a number of PDCCH candidates based on a number of downlink cells and a number of sets of downlink cells scheduled using the DCI; and means for transmitting, to the UE, up to the number of PDCCH candidates on an active downlink bandwidth parts (DL BWP) of the first serving cell. The apparatus may further comprise means for determining a number of control channel elements (CCEs) based on a number of downlink cells and a number of sets of downlink cells scheduled using the DCI; and means for transmitting up to the number of CCEs on an active downlink bandwidth parts (DL BWP) of the first serving cell. The apparatus may further comprise means for transmitting a configurable number of DCIs associated with the first serving cell and the second serving cell included in the joint-carrier scheduling scheme, wherein the configurable number of DCIs are associated with at least one of a physical downlink shared channel (PDSCH) transmission or a physical uplink shared channel (PUSCH) transmission.

In some instances, an apparatus comprises a transceiver configured to: receive, from a base station (BS) of a first serving cell, a downlink control information (DCI) that indicates a joint-carrier scheduling scheme; and a processor in communication with the transceiver, the processor configured to: schedule, using the joint-carrier scheduling scheme in the DCI, first data for communication on a first shared channel associated with the first serving cell and second data for communication on a second shared channel associated with a second serving cell. The transceiver may be further configured to transmit the first data using the first shared channel and the second data using the second shared channel. The transceiver may be further configured to receive the first data using the first shared channel and the second data using the second shared channel. The transceiver may be further configured to receive a radio resource control (RRC) signal indicating a correspondence between a CIF value and the joint-carrier scheduling scheme. The transceiver may be further configured to receive a radio resource control (RRC) signal indicating a number of physical downlink control channel (PDCCH) candidates in a search space that include the DCI indicating the joint-carrier scheduling scheme. The processor may be further configured to determine a number of PDCCH candidates associated with the DCI indicating the joint-carrier scheduling scheme based on a number of PDCCH candidates associated with a second DCI indicating a same-carrier scheduling scheme or a cross-carrier scheduling scheme. The transceiver may be further configured to receive the DCI indicating the joint-carrier scheduling scheme when the UE enables search space sharing using a DCI indicating a cross-carrier scheduling scheme. The transceiver may be further configured to monitor at least one PDCCH candidate in a search space set that carries the DCI for up to a configurable number of DCI format sizes when a CIF field indicates the joint-carrier scheduling scheme; and the processor may be further configured to determine a number of the DCI formats sizes based on the at least one monitored PDCCH candidate in the search space set. The processor may be further configured to determine a number of DCI format sizes for the joint-carrier scheduling scheme based on a number of DCI format sizes used for scheduling data on the first serving cell or a number of DCI format sizes used for scheduling data on the second serving cell. The processor may be further configured to determine a DCI format size of the DCI as one of preconfigured DCI format sizes transmitted by the BS. The processor may be further configured to determine a number of PDCCH candidates based on a number of downlink cells and a number of sets of downlink cells scheduled using the DCI; and the transceiver may be further configured to monitor up to the number of PDCCH candidates on an active downlink bandwidth parts (DL BWP) of the first serving cell. The processor may be further configured to determine a number of control channel elements (CCEs) based on a number of downlink cells and a number of sets of downlink cells scheduled using the DCI; and the transceiver may be further configured to monitor up to the number of CCEs on an active downlink bandwidth parts (DL BWP) of the first serving cell. The apparatus may further comprise memory in communication with the processor, the memory configured to store a configurable number of DCIs associated with the first serving cell and the second serving cell included in the joint-carrier scheduling scheme, wherein the configurable number of DCIs is associated with at least one of a physical downlink shared channel (PDSCH) transmission or a physical uplink shared channel (PUSCH) transmission.

In some instances, an apparatus comprises a processor configured to configure a joint-carrier scheduling scheme using a downlink control information (DCI), wherein the joint-carrier scheduling scheme causes a first data to be communicated on a first shared channel associated with a first serving cell and second data to be communicated on a second shared channel associated with a second serving cell; and a transceiver in communication with the processor, the transceiver configured to transmit, to a user equipment (UE), the DCI that indicates the joint-carrier scheduling scheme. The processor may be further configured to configure a radio resource control (RRC) signal indicating a correspondence between a CIF value and the joint-carrier scheduling scheme. The processor may be further configured to configure a RRC signal indicating a number of physical downlink control channel (PDCCH) candidates in a search space set that can include the DCI indicating the joint-carrier scheduling scheme. The processor may be further configured to configure a number of PDCCH candidates associated with the DCI indicating the joint-carrier scheduling scheme based on a number of PDCCH candidates associated with a second DCI indicating a same-carrier scheduling scheme or a cross-carrier scheduling scheme. The transceiver may be further configured to transmit an RRC signal to the UE that enables search space sharing for a cross-carrier scheduling scheme or a same-carrier scheduling scheme; and the processor may be further configured to configure the DCI indicating the joint-carrier scheduling scheme when the RCC signal enables the search space sharing. The processor may be further configured to configure a number of DCI format sizes for the joint-carrier scheduling scheme; and the transceiver may be further configured to transmit a PDCCH that includes the DCI in at least one of the DCI format sizes. The processor may be further configured to configure a number of DCI format sizes for the joint-carrier scheduling scheme based on a number of DCI format sizes used for scheduling data on the first serving cell or a number of DCI format sizes used for scheduling data on the second serving cell. The processor may be further configured to determine a DCI format size of the DCI as one of preconfigured DCI format sizes. The processor may be further configured to determine a number of PDCCH candidates based on a number of downlink cells and a number of sets of downlink cells scheduled using the DCI; and the transceiver may be further configured to transmit, to the UE, up to the number of PDCCH candidates on an active downlink bandwidth parts (DL BWP) of the first serving cell. The processor may be further configured to determine a number of control channel elements (CCEs) based on a number of downlink cells and a number of sets of downlink cells scheduled using the DCI; and the transceiver is further configured to transmit up to the number of CCEs on an active downlink bandwidth parts (DL BWP) of the first serving cell. The transceiver may be further configured to transmit a configurable number of DCIs associated with the first serving cell and the second serving cell included in the joint-carrier scheduling scheme, wherein the configurable number of DCIs are associated with at least one of a physical downlink shared channel (PDSCH) transmission or a physical uplink shared channel (PUSCH) transmission.

In some instances, a non-transitory computer-readable medium having program code recorded thereon is provided, the program code comprising: code for causing a user equipment (UE) to receive from a base station (BS) of a first serving cell a downlink control information (DCI) that indicates a joint-carrier scheduling scheme; and code for causing the UE to schedule, using the joint-carrier scheduling scheme in the DCI, first data for communication on a first shared channel associated with the first serving cell and second data for communication on a second shared channel associated with a second serving cell. The non-transitory computer-readable medium may further comprise code for causing the UE to transmit the first data using the first shared channel and the second data using the second shared channel. The non-transitory computer-readable medium may further comprise code for causing the UE to receive the first data using the first shared channel and the second data using the second shared channel. The non-transitory computer-readable medium may further comprise code for causing the UE to receive a radio resource control (RRC) signal indicating a correspondence between a CIF value and the joint-carrier scheduling scheme. The non-transitory computer-readable medium may further comprise code for causing the UE to receive a radio resource control (RRC) signal indicating a number of physical downlink control channel (PDCCH) candidates in a search space that include the DCI indicating the joint-carrier scheduling scheme. The non-transitory computer-readable medium may further comprise code for causing the UE to determine a number of PDCCH candidates associated with the DCI indicating the joint-carrier scheduling scheme based on a number of PDCCH candidates associated with a second DCI indicating a same-carrier scheduling scheme or a cross-carrier scheduling scheme. The non-transitory computer-readable medium may further comprise code for causing the UE to receive the DCI indicating the joint-carrier scheduling scheme when the UE enables search space sharing using a DCI indicating a cross-carrier scheduling scheme. The non-transitory computer-readable medium may further comprise code for causing the UE to monitor at least one PDCCH candidate in a search space set that carries the DCI for up to a configurable number of DCI format sizes when a CIF field indicates the joint-carrier scheduling scheme; and code for causing the UE to determine a number of the DCI formats sizes based on the at least one monitored PDCCH candidate in the search space set. The non-transitory computer-readable medium may further comprise code for causing the UE to determine a number of DCI format sizes for the joint-carrier scheduling scheme based on a number of DCI format sizes used for scheduling data on the first serving cell or a number of DCI format sizes used for scheduling data on the second serving cell. The non-transitory computer-readable medium may further comprise code for causing the UE to determine a DCI format size of the DCI as one of preconfigured DCI format sizes transmitted by the BS. The non-transitory computer-readable medium may further comprise code for causing the UE to determine a number of PDCCH candidates based on a number of downlink cells and a number of sets of downlink cells scheduled using the DCI; and code for causing the UE to monitor up to the number of PDCCH candidates on an active downlink bandwidth parts (DL BWP) of the first serving cell. The non-transitory computer-readable medium may further comprise code for causing the UE to determine a number of control channel elements (CCEs) based on a number of downlink cells and a number of sets of downlink cells scheduled using the DCI; and code for causing the UE to monitor up to the number of CCEs on an active downlink bandwidth parts (DL BWP) of the first serving cell. The non-transitory computer-readable medium may further comprise code for causing the UE to store a configurable number of DCIs associated with the first serving cell and the second serving cell included in the joint-carrier scheduling scheme, wherein the configurable number of DCIs is associated with at least one of a physical downlink shared channel (PDSCH) transmission or a physical uplink shared channel (PUSCH) transmission.

In some instances, a non-transitory computer-readable medium having program code recorded thereon is provided, the program code comprising: code for causing a base station (BS) of a first serving cell to configure a joint-carrier scheduling scheme using a downlink control information (DCI), wherein in the joint-carrier scheduling scheme causes a first data to be communicated on a first shared channel associated with the first serving cell and second data to be communicated on a second shared channel associated with a second serving cell; and code for causing the BS to transmit, to a user equipment (UE), the DCI that indicates the joint-carrier scheduling scheme. The non-transitory computer-readable medium may further comprise code for causing the BS to configure a radio resource control (RRC) signal indicating a correspondence between a CIF value and the joint-carrier scheduling scheme. The non-transitory computer-readable medium may further comprise code for causing the BS to configure a RRC signal indicating a number of physical downlink control channel (PDCCH) candidates in a search space set that can include the DCI indicating the joint-carrier scheduling scheme. The non-transitory computer-readable medium may further comprise code for causing the BS to configure a number of PDCCH candidates associated with the DCI indicating the joint-carrier scheduling scheme based on a number of PDCCH candidates associated with a second DCI indicating a same-carrier scheduling scheme or a cross-carrier scheduling scheme. The non-transitory computer-readable medium may further comprise code for causing the BS to transmit, to the UE, an RRC signal that enables search space sharing for a cross-carrier scheduling scheme or a same-carrier scheduling scheme; and code for causing the BS to configure the DCI indicating the joint-carrier scheduling scheme when the RCC signal enables the search space sharing. The non-transitory computer-readable medium may further comprise code for causing the BS to configure a number of DCI format sizes for the joint-carrier scheduling scheme; and code for causing the BS to transmit a PDCCH that includes the DCI in at least one of the DCI format sizes. The non-transitory computer-readable medium may further comprise code for causing the BS to configure a number of DCI format sizes for the joint-carrier scheduling scheme based on a number of DCI format sizes used for scheduling data on the first serving cell or a number of DCI format sizes used for scheduling data on the second serving cell. The non-transitory computer-readable medium may further comprise code for causing the BS to determine a DCI format size of the DCI as one of preconfigured DCI format sizes. The non-transitory computer-readable medium may further comprise code for causing the BS to determine a number of PDCCH candidates based on a number of downlink cells and a number of sets of downlink cells scheduled using the DCI; and code for causing the BS to transmit, to the UE, up to the number of PDCCH candidates on an active downlink bandwidth parts (DL BWP) of the first serving cell. The non-transitory computer-readable medium may further comprise code for causing the BS to determine a number of control channel elements (CCEs) based on a number of downlink cells and a number of sets of downlink cells scheduled using the DCI; and code for causing the BS to transmit, at the BS, up to the number of CCEs on an active downlink bandwidth parts (DL BWP) of the first serving cell. The non-transitory computer-readable medium may further comprise code for causing the BS to transmit a configurable number of DCIs associated with the first serving cell and the second serving cell included in the joint-carrier scheduling scheme, wherein the configurable number of DCIs are associated with at least one of a physical downlink shared channel (PDSCH) transmission or a physical uplink shared channel (PUSCH) transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication at a user equipment (UE), comprising:
   receiving, via a first serving cell, a downlink control information (DCI) that indicates a joint-carrier scheduling scheme;
   identifying a number of DCI format sizes for the joint-carrier scheduling scheme based on a first number of DCI format sizes used for scheduling first data on the first serving cell and a second number of DCI format sizes used for scheduling second data on a second serving cell, wherein the first number of DCI format sizes is different from the second number of DCI format sizes; and
   scheduling, using the joint-carrier scheduling scheme in the DCI, the first data for a first communication on a first shared channel associated with the first serving cell and the second data for a second communication on a second shared channel associated with the second serving cell.

2. The method of claim 1, wherein the first data for communication is associated with a transmission of the first data or a reception of the first data.

3. The method of claim 1, wherein the second data for communication is associated with a transmission of the second data or a reception of the second data.

4. The method of claim 1, further comprising:
   transmitting the first data using the first shared channel and the second data using the second shared channel.

5. The method of claim 1, further comprising:
   receiving the first data using the first shared channel and the second data using the second shared channel.

6. The method of claim 1, wherein a carrier indicator field (CIF) in the DCI indicates the joint-carrier scheduling scheme.

7. The method of claim 1, further comprising:
   receiving a radio resource control (RRC) signal indicating a correspondence between a CIF value and the joint-carrier scheduling scheme.

8. The method of claim 1, further comprising:
   receiving, a radio resource control (RRC) signal indicating a number of physical downlink control channel (PDCCH) candidates in a search space that includes the DCI indicating the joint-carrier scheduling scheme.

9. The method of claim 1, further comprising:
   monitoring a number of first PDCCH candidates associated with the DCI indicating the joint-carrier scheduling scheme, wherein the number of first PDCCI candidates is based on a number of second PDCCH candidates associated with a second DCI indicating a same-carrier scheduling scheme or a cross-carrier scheduling scheme.

10. The method of claim 1, further comprising:
    enabling search space sharing using a second DCI indicating a cross-carrier scheduling scheme, wherein the DCI indicating the joint-carrier scheduling scheme is received after the search space is enabled.

11. The method of claim 1, further comprising:
    identifying that a CIF value indicates the joint-carrier scheduling scheme;
    monitoring at least one PDCCH candidate in a search space set that carries the DCI for up to a configurable number of DCI format sizes based on the identifying; and
    counting a number of the DCI formats sizes based on the at least one monitored PDCCH candidate in the search space set.

12. The method of claim 1, further comprising:
    monitoring at least one PDCCH candidate for the DCI having a DCI format size corresponding to one of preconfigured DCI format sizes.

13. The method of claim 1, further comprising:
    monitoring up to a number of PDCCH candidates on active downlink bandwidth parts (DL BWP) of the first serving cell, wherein the number of PDCCH candidates is based on a number of downlink cells and a number of sets of downlink cells scheduled using the DCI.

14. The method of claim 1, further comprising:
    monitoring up to a number of control channel element (CCE) locations on active downlink bandwidth parts (DL BWP) associated with the first serving cell, wherein the number of CCE locations is based on a number of downlink cells and a number of sets of downlink cells scheduled using the DCI, and wherein CCE locations include at least one PDCCH candidate.

15. The method of claim 1, further comprising:
    a configurable a number of DCIs associated with the first serving cell and the second serving cell, wherein the first serving cell and the second serving cell are included in the joint-carrier scheduling scheme.

16. The method of claim 15, wherein the configurable number of DCIs is associated with a physical downlink shared channel (PDSCH) transmission.

17. The method of claim 15, wherein the configurable number of DCIs are associated with a physical uplink shared channel (PUSCH) transmission.

18. A method of wireless communication at a base station (BS) of a first serving cell, comprising:
    configuring a joint-carrier scheduling scheme using a downlink control information (DCI), wherein the joint-carrier scheduling scheme is for a first communication of first data on first shared channel associated with the first serving cell and for a second communication of second data on a second shared channel associated with a second serving cell;

configuring a number of DCI format sizes for the joint-carrier scheduling scheme based on a first number of DCI format sizes used for scheduling the first data on the first serving cell and a second number of DCI format sizes used for scheduling the second data on the second serving cell, wherein the first number of DCI format sizes is different from the second number of DCI format sizes; and transmitting, to a user equipment (UE), the DCI that indicates the joint-carrier scheduling scheme.

19. The method of claim 18, wherein the first data to be communicated is a transmission of the first data or a reception of the first data.

20. The method of claim 18, wherein the second data to be communicated is a transmission of the second data or a reception of the second data.

21. The method of claim 18, wherein a carrier indicator field (CIF) in the DCI indicates the joint-carrier scheduling scheme.

22. The method of claim 18, further comprising:
configuring, at the BS, a radio resource control (RRC) signal indicating a correspondence between a CIF value and the joint-carrier scheduling scheme.

23. The method of claim 18, further comprising:
configuring, at the BS, a RRC signal indicating a number of physical downlink control channel (PDCCH) candidates in a search space set that includes the DCI indicating the joint-carrier scheduling scheme.

24. The method of claim 18, further comprising:
configuring a number of first PDCCH candidates associated with the DCI indicating the joint-carrier scheduling scheme based on a number of second PDCCH candidates associated with a second DCI indicating a same-carrier scheduling scheme or a cross-carrier scheduling scheme.

25. The method of claim 18, further comprising:
transmitting an RRC signal to the UE that enables search space sharing for a cross-carrier scheduling scheme or a same-carrier scheduling scheme; and
configuring the DCI indicating the joint-carrier scheduling scheme when the RRC signal enables the search space sharing.

26. The method of claim 18, further comprising:
transmitting a PDCCH that includes the DCI in at least one of the DCI format sizes.

27. The method of claim 18, wherein a DCI format size of the DCI is one of preconfigured DCI format sizes.

28. The method of claim 18, further comprising:
transmitting up to a number of PDCCH candidates on active downlink bandwidth parts (DL BWP) of the first serving cell, wherein the number of PDCCH candidates is based on a number of downlink cells and a number of sets of downlink cells scheduled using the DCI.

29. The method of claim 18, further comprising:
transmitting up to a number of control channel element locations on active downlink bandwidth parts (DL BWP) of the first serving cell, wherein the number of CCE is based on a number of downlink cells and a number of sets of downlink cells scheduled using the DCI, and wherein CCE locations include at least one PDCCH candidate.

30. The method of claim 18, further comprising:
transmitting, at the BS, a configurable number of DCIs associated with the first serving cell and the second serving cell included in the joint-carrier scheduling scheme.

31. The method of claim 30, wherein the configurable number of DCIs are associated with a physical downlink shared channel (PDSCH) transmission.

32. The method of claim 30, wherein the configurable number of DCIs are associated with a physical uplink shared channel (PUSCH) transmission.

33. A user equipment (UE) comprising:
at least one transceiver;
memory comprising instructions; and
one or more processors configured execute the instructions to cause the UE to:
receive, via the at least one transceiver, from a first serving cell, a downlink control information (DCI) that indicates a joint-carrier scheduling scheme;
identify a number of DCI format sizes for the joint-carrier scheduling scheme based on a first number of DCI format sizes used for scheduling first data on the first serving cell and a second number of DCI format sizes used for scheduling second data on a second serving cell, wherein the first number of DCI format sizes is different from the second number of DCI format sizes; and
schedule, using the joint-carrier scheduling scheme in the DCI, the first data for a first communication on a first shared channel associated with the first serving cell and the second data for a second communication on a second shared channel associated with the second serving cell.

34. The UE of claim 33, wherein the first data for communication is associated with a transmission of the first data or a reception of the first data.

35. The UE of claim 33, wherein a carrier indicator field (CIF) in the DCI indicates the joint-carrier scheduling scheme.

* * * * *